US008285777B2

(12) United States Patent
Giles et al.

(10) Patent No.: US 8,285,777 B2
(45) Date of Patent: Oct. 9, 2012

(54) MANUFACTURING METHOD AND SOFTWARE PRODUCT FOR OPTIMIZING INFORMATION FLOW

(75) Inventors: Gary W. Giles, Elbing, KS (US); Randall E. Patten, Rose Hill, KS (US)

(73) Assignee: The Boeing Company, Chicago, IL (US)

( * ) Notice: Subject to any disclaimer, the term of this patent is extended or adjusted under 35 U.S.C. 154(b) by 969 days.

(21) Appl. No.: 10/461,037

(22) Filed: Jun. 13, 2003

(65) Prior Publication Data
US 2003/0212766 A1    Nov. 13, 2003

Related U.S. Application Data

(63) Continuation of application No. 09/981,949, filed on Oct. 17, 2001.

(51) Int. Cl.
*G06F 15/16* (2006.01)
*G06Q 10/00* (2006.01)
*G06Q 40/00* (2006.01)

(52) U.S. Cl. ........................ 709/203; 709/201; 709/202
(58) Field of Classification Search .......... 709/201–203; 705/1.1, 4
See application file for complete search history.

(56) References Cited

U.S. PATENT DOCUMENTS

| | | | | |
|---|---|---|---|---|
| 5,146,404 A * | 9/1992 | Calloway et al. | ................. | 705/1 |
| 5,148,591 A * | 9/1992 | Pryor | ........................ | 29/407.04 |
| 5,594,639 A * | 1/1997 | Atsumi | ........................ | 700/107 |
| 5,671,361 A * | 9/1997 | Brown et al. | ...................... | 705/9 |
| 6,064,429 A * | 5/2000 | Belk et al. | ...................... | 348/128 |
| 6,289,345 B1 * | 9/2001 | Yasue | .............................. | 707/10 |
| 6,463,352 B1 * | 10/2002 | Tadokoro et al. | ............. | 700/169 |
| 6,847,853 B1 * | 1/2005 | Vinciarelli et al. | ............. | 700/97 |
| 6,850,252 B1 * | 2/2005 | Hoffberg | ...................... | 715/716 |
| 6,959,235 B1 * | 10/2005 | Abdel-Malek et al. | ......... | 701/33 |
| 6,961,687 B1 * | 11/2005 | Myers et al. | ...................... | 703/6 |
| 7,013,284 B2 * | 3/2006 | Guyan et al. | ...................... | 705/4 |
| 7,187,663 B2 * | 3/2007 | Schmidt | ........................ | 370/313 |
| 7,617,240 B2 * | 11/2009 | Guyan et al. | .................. | 705/1.1 |
| 7,979,382 B2 * | 7/2011 | Guyan et al. | .......................... | 1/1 |
| 2001/0047276 A1 * | 11/2001 | Eisenhart | .......................... | 705/1 |
| 2002/0046214 A1 * | 4/2002 | Sandifer | .................... | 707/104.1 |
| 2002/0069210 A1 * | 6/2002 | Navani et al. | ............... | 707/104.1 |
| 2002/0138568 A1 * | 9/2002 | Johansson | ..................... | 709/203 |
| 2003/0014426 A1 * | 1/2003 | Gimbert et al. | ............ | 707/104.1 |

OTHER PUBLICATIONS

Stary. TADEUS: Seamless Development of Task-Based and User-Oriented Interfaces. IEEE. Sep. 2000. pp. 509-525.*
Jack. Mechatronics Engineer on a disk. 2 pages. 2001.*
Lynch. Exploring distributed numerical control. 2 pages. 1992.*
Lee et al. Develoment of a user-friendly polishing robot system. pp. 1914-1919. 1999.*

* cited by examiner

*Primary Examiner* — Hieu Hoang

(57) ABSTRACT

A manufacturing method, software product, system for optimizing information flow within a manufacturing facility based upon the use of a network, a structured data exchange, and a browser allowing access to a plurality of servers, themselves containing software data, thereby presenting an uniform look and feel for the interface serving that information to each employee. Administrators grant employees access to data according to predefined constellations of roles within the manufacturing facility.

15 Claims, 22 Drawing Sheets

THE MACHINE OPERATOR 12 MINUTES, PER ORDER, ON THE NC MACHINE PART PROCESS.

AS IS

| TIME IN MINUTES | 3 | 1 | 1 | 5 | 2 | 3 |
|---|---|---|---|---|---|---|
| 427 | LOGIN TO WMS | SELECT THE JOB FROM THE LIST | SELECT "SETUP TIME" | RETRIEVE THE SETUP DOCUMENT FROM THE FILE CABINET | VERIFY EXCLUSIVE ID-NC DOCUMENT & PLANNING | LOG INTO WEBDNC |
| | 2 | 3 | 12 | 120 | 1 | 656 |
| | DOWNLOAD MCD | LOG INTO BOLD-LITE | REVIEW 2D DRAWINGS | PERFORM MACHINE SETUP | GO INTO WMS AND SELECT "RUN TIME" | EXECUTE PART PROGRAM |

431 ▭▭▭▭▭▭▭▭▭▭▭▭▭▭▭▭▭▭▭▭▭ 21 MINUTES

□ = 1 MINUTE
▢ = OUT OF SCOPE

434 ▭▭▭▭▭▭▭▭▭ 9 MINUTES

TO BE

| TIME IN MINUTES | 3 | 1 | 1 | 1 | 2 | 12 |
|---|---|---|---|---|---|---|
| 437 | OPERATOR LOGS IN TO PORTAL | SELECT THE JOB FROM THE LIST | SELECT "SETUP TIME" IN WMS | RETRIEVE THE SETUP DOCUMENT FROM PORTAL | DOWNLOAD MCD | REVIEW 2D DRAWINGS |
| | 120 | 1 | 656 | | | |
| | PERFORM MACHINE SETUP | OPERATOR SELECTS RUN MODE-WMS | EXECUTES THE PROGRAM | | | |

*Fig. 18.*

MANUFACTURING METHOD AND SOFTWARE PRODUCT FOR OPTIMIZING INFORMATION FLOW

RELATED APPLICATION

This application is related to an application entitled, "System, Method And Computer-Program Product For Transferring A Numerical Control Program To Thereby Control A Machine Tool Controller" Ser. No. 09/864,496, published as Application Number 20020193905 filed on May 24, 2001 and the disclosure of this prior applications is considered part of (and is incorporated by reference in) the disclosure of this application. This application is a continuation of and claims priority to an application entitled "A Manufacturing Method and Software Product for Optimizing Information Flow" filed on Oct. 17, 2001, having Ser. No. 09/981,949, and published as Application Number 20030074424.

FIELD OF THE INVENTION

This invention relates generally to Manufacturing and, more specifically, to Information Technology.

BACKGROUND OF THE INVENTION

Over the last 25 years or more, manufacturers have invested in computer systems to help run their operations. Manufacturers designed the systems on an ad hoc basis. Early manufacturing information systems were custom built with specific software developed for a particular manufacturer's operating style, hardware, or reporting needs. These custom systems proved to be costly not only at the installation and implementation phases but also later when debugging after implementation. Because such a system is unique to the manufacturer, there exists no insight gained in the course of service of a particular product. Each installation was sui generis, an installation onto itself.

Throughout the nineties, large manufactures have moved toward the purchase of high-end commercial off-the-shelf software for the purpose of defining and completing several of the tasks necessary to manufacture product. The motivation for doing so was, at least two-fold. Manufactures spent less for the purchase of commercial grade off-the-shelf software, and the manufacturer could anticipate less downtime during service cycles because developers have derived much of the knowledge of particular glitches and bugs in servicing similar installations of the same software.

Nonetheless, these off-the-shelf software products carried with them a new hidden cost. Each of the off-the-shelf applications are, themselves, designed as the top-level logic necessary to control specific portions of the manufacturing process. Each functions as though in a vacuum without significant interaction with other systems.

Unfortunately, by placing these software products at the highest level, information managed by a particular software product is not accessible to those specifically permitted to use the information. Thus, MRPII/ERP systems cannot share information with CAD/CAM systems and likewise, CAD/CAM systems cannot share information with numeric control systems. Enterprise systems stand alone. As each system is put in place, it stands autonomous, where it reigns supreme over information necessary in its particular domain. As a result, the manufacturer who purchases some of the best software products in each field ends up isolating the information used for each phase of manufacturing.

Very few cross-system information portals exist. Those that do exist such as Enovia® for the CATIA® computer assisted drafting and design program do not actually port information across but rather act as a browser and extension of the program and not a proper portal for information by other manufacturers. The bridge is a human bridge, carrying information to the site needed. While such bridges do allow the broadcast of information controlled by the software, they do not afford an actual sharing of information between programs without the introduction of key operator error.

As a result of the vast number of computer products used in manufacture, the information necessary to make decisions within the factory exists in a patchwork quilt of domains in the control of a plurality of high-end programs analogous to the resources of feudal England in the control of a number of feudal lords. The effects of this feudal control over information can be seen through various sets of eyes within the manufacturing system. In studies conducted by the applicant, up to 45% of some worker's time spent in production is attributable to logging into and out of the various domains that control tools, design specifications, manpower tasking, and planning data. For instance, a lead machinist might spend 33 minutes per day per task receiving job assignments for the day; for each order it may take as much as 13 minutes to check the appropriate tools out of the tool crib and the necessary part data for assembly. The actual production of the part may take as little as 12 minutes per order, but then logging off of a particular part may take an additional 8 minutes per order. In short, a large part of a productive worker's day is given over to the task of logging into and out of various systems necessary to control data or tools.

On average, in one person's workday, 55% is spent in activities that add value to the manufactured product, the other 45% is given to administrative overhead of logging into and out of various systems to schedule work, track work, gather data necessary to do work, closing the work, and notifying a system of the completion of that work. Manual methods order and input data, order tools, parts and information, and execute hundreds of repetitive and routine transactions as though they were decisions requiring human judgment.

The administrative overhead of logging into and out of various systems has also proven to be the least satisfying portion of an individual worker's job tasking for a given day. The tasks appurtenant to the logging into and out of various systems are repetitive and redundant, and while computers have allowed automated production of many assemblies in the manufacturing process, they have not delivered on their promise to take repetitive and redundant work out of the realm of skilled labor. Computers are very well suited to performing the tasks of logging into and out of various domains and removing the information management overhead from the worker's day.

What is needed is a higher-level meta-layer of software that will lessen the information overhead and will be an effective port of information to all individuals at any level of the manufacturing process. Such a solution could also be used to port critical information to vendors, customers, and suppliers thereby allowing rapid changes in tooling in response to perceived needs. Management decisions with regard to such needs will be better informed where information can be ported to decision makers. A highly intuitive interface for presenting the information is desirable as the same will allow data that was previously available only to specialists to be presented to all who need to be "in the know" without paying a high training premium. Thus, what is needed is a browser-like interface for bi-directional access to manufacturing data.

SUMMARY OF THE INVENTION

The instant invention is a method, software product, and system for sharing information within a manufacturing facility. By use of a browser and a uniform look and feel of the data presented to the browser, the inventive system presents the information that might assist any employee of the manufacturing facility with in any aspect of employment. By virtue the inventive system, the employees of the facility may access information without separate log-ins; may automate numerous of the processes within the facility including checking out tools and cutters from tool cribs; requisitioning materials; and, signing off of various tasks for timekeeping purposes.

The present invention comprises a high-level meta-layer for integrating the communications within a manufacturing facility comprising a graphic user interface, a structured data exchange and software wrappers allowing access to the several software servers within the manufacturing facility.

In accordance with further aspects of the invention, allows remote access to the software servers allowing employees to perform their tasks at locations remote to the factory.

In accordance with other aspects of the invention, the graphic user interface is implemented with a browser making the look and feel of the operation of the software uniform for all users.

As will be readily appreciated from the foregoing summary, the invention provides for implementation across great geographic distances allowing for the provision of workstations remote from the factory floor.

BRIEF DESCRIPTION OF THE DRAWINGS

The preferred and alternative embodiments of the present invention are described in detail below with reference to the following drawings.

FIGS. 16-19 show exemplars of the typical savings realized in the performance various tasks of a Machine Shop Lead in an hour of tasking;

DETAILED DESCRIPTION OF THE INVENTION

Modern factories comprise numbers of automated machines and tooling that are driven by embedded processors. Servers in these factories send detailed specifications for the produced parts, sub-assemblies, assemblies, and products. Computers also manage administrative functions; these functions include the provision of materials, parts, and tools. Each of these existing or "legacy" systems are built for the task at hand and generally will not include a single standard for sharing data and transmitting information to other legacy systems within the factory.

Figure 1:
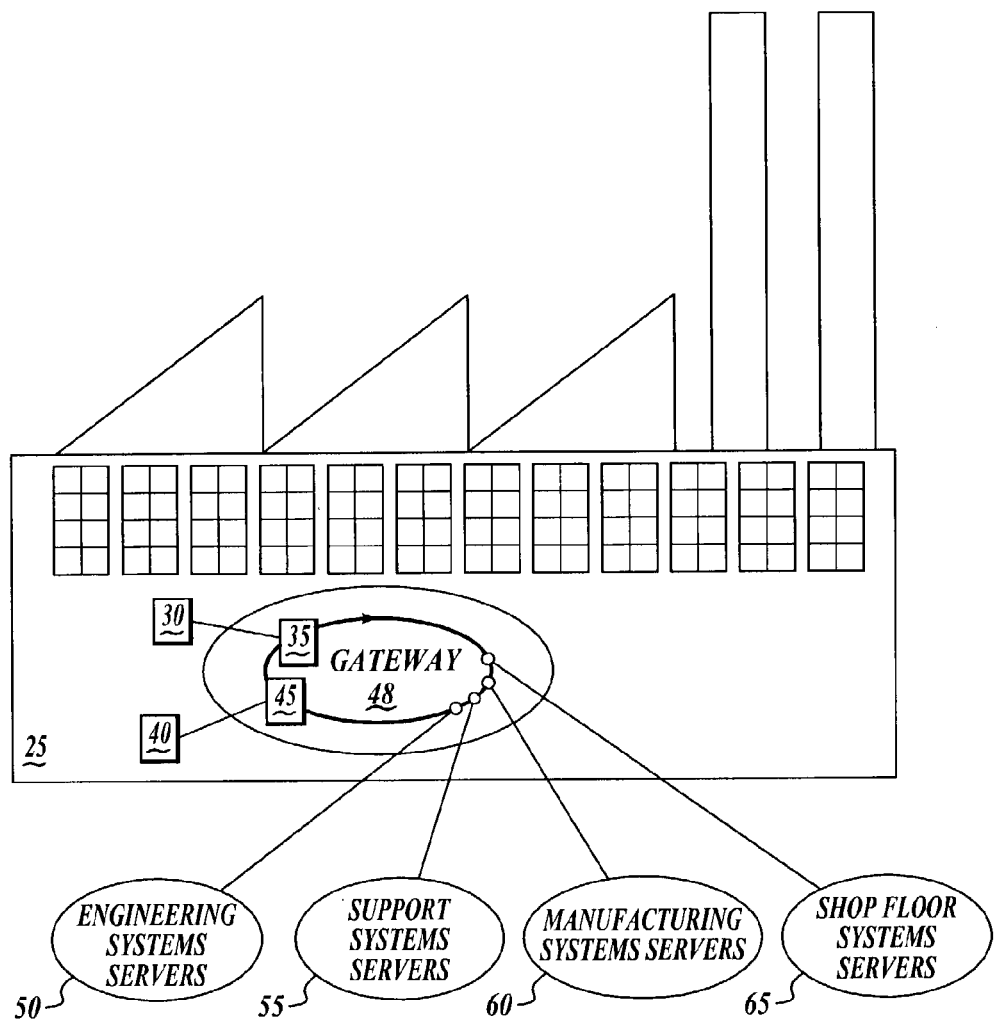
FIG. 1 is a basic overview of the elements of the inventive structure of the invention in a factory-based environment.

FIG. 1 represents elements of the inventive system. Generic labels represent several legacy systems necessary for engineering 50, support 55, manufacturing 60, and shop floor systems 65. A ring demarked as the Gateway 48 represents the whole of the networked system including a plurality of inventive system servers 35 and 45, as well as a plurality of browsers 30 and 40. This stylized representation does not limit the numbers of servers or browsers within the system but sets forth a certain structure. The inventive system includes any number, more or less than represented in FIG. 1.

The inventive system set forth in FIG. 1 represents a shift in the paradigm of modern manufacturing systems. Unlike the past, human hands rarely, if ever, touch the manufactured product. Several are the products, such as, for instance, integrated circuitry chips, where the touch of a human is fatal to the manufacture of the product. Even without consideration of such dangers to the product, humans have proven poorly suited to the transport of products through a factory and thus, factories have removed the human touch. Repetitive motions are the realm of automation. People bring insight, wisdom, and knowledge, collective skill, to the assembly lines.

Here, the inventive system set forth in FIG. 1, presumes minimal human contact with the product. Automated legacy systems handle product transport and assembly. Generally, cameras integrated into the legacy systems give visual information at cutting edges, critical location points, and along lines of part movement. These legacy systems deliver this information to display screens on the equipment or on pendant operator interfaces.

The most striking element of the invention evident in FIG. 1 is the presence of the network gateway 48 tying all of the legacy systems together. Another term for legacy systems is commercial-off-the-shelf or COTS. Those skilled in the art know several ways to tie such legacy systems together. Articles such as those funded by DARPA Contract F30602-96-C0333 such as: *Hardening COTS Software with Generic*

*Software Wrappers*, Timothy Fraser, Lee Badger, and Mark Feldman, published in the Proceedings of the 1999 IEEE Symposium on Security and Privacy; *Detecting and Countering System Intrusions; Using Software Wrappers*, Calvin Ko, Timothy Fraser, Lee Badger, and Douglas Kilpatrick, published in the Proceedings of the 9th USENIX Security Symposium, Denver, Colo., Aug. 14-17, 2000; *Building Blocks for Achieving Quality of Service with Commercial Off-the-Shelf (COTS) Middleware*, Andreas Polze, May 1999, TECHNICAL REPORT, CMU/SEI-99-TR-001, ESC-TR-99-001; *Into the Black Box: A Case Study in Obtaining Visibility into Commercial Software*, Daniel Plakosh, Scott Hissam, and Kurt Wallnau, March 1999, COTS-Based Systems Initiative, Technical Note, CMU/SEI-99-TN-010; *Custom vs. Off-The-Shelf Architecture*, Robert C. Seacord, Kurt Wallnau, John Robert, Santiago Comella-Dorda, and Scott A. Hissam, May 1999, COTS-Based Systems Initiative, Technical Note CMU/SEI-99-TN-006; TECHNICAL REPORT CMU/SEI-2000-TR-010 ESC-TR-2000-010; *An Activity Framework for COTS-Based Systems*, Tricia Oberndorf, Lisa Brownsword, and Carol A. Sledge, PhD, October 2000.

Figure 2:
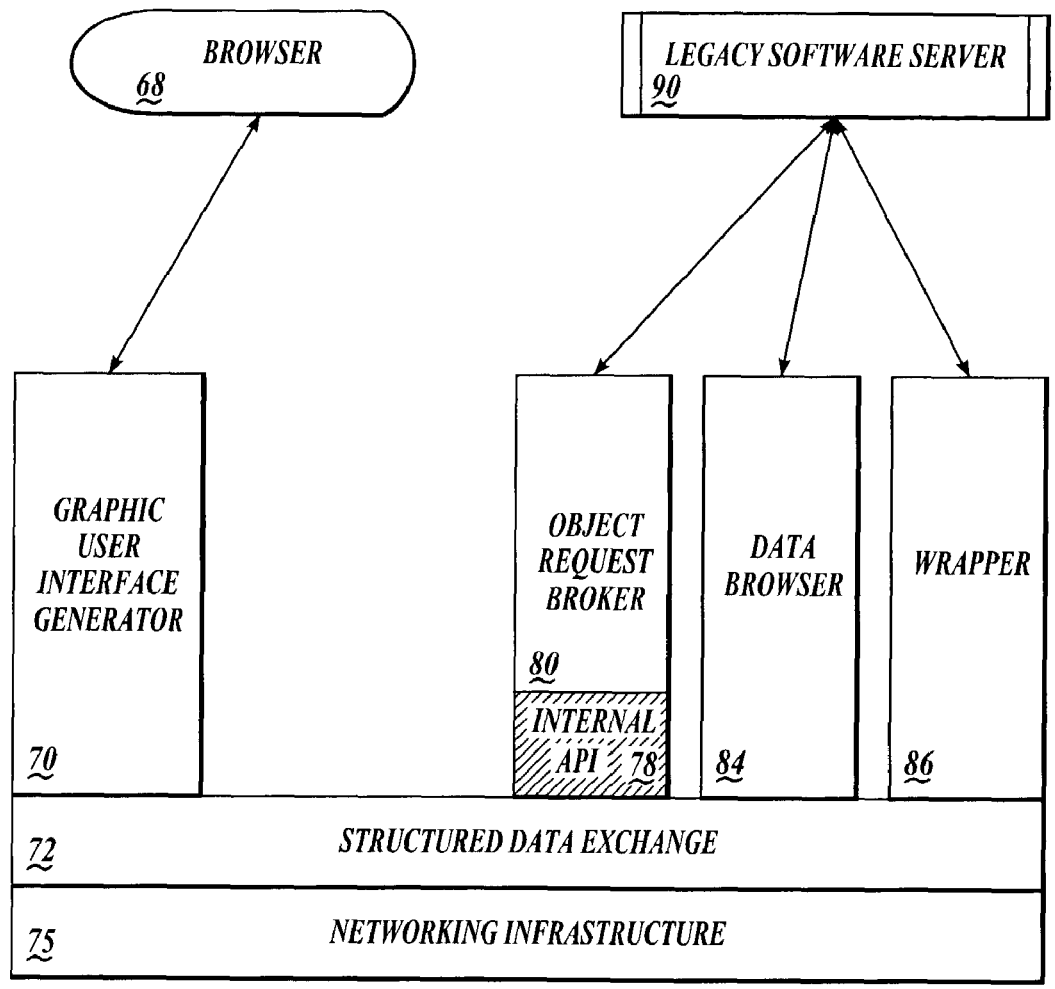
FIG. 2 is a portrayal of the functional detail of some of the several methods by which skilled contractors might configure a software infrastructure to implement the inventive interface between the browser and the legacy software servers.

FIG. 2 shows three of the several methods by which skilled contractors can tie the legacy software into a workable software infrastructure. Working from the distal element of the invention, the skilled employee works the inventive system through a graphic user interface, preferably a commercially available browser 68 such as Netscape® or Internet Explorer® or any supported browser. The highly intuitive nature of such browsers 68 slashes training time on the software itself. It is reasonable, in the current days, to believe that most of the skilled employees available to the manufacturer would be very familiar with the browser 68. The designed graphics that comprise the graphic user interface portrayed on the browser would continue that highly intuitive interface.

To support that browser 68, the system has a graphic user interface engine such as JAVA. One of the requirements for a suitable engine is that the interface engine be suited to a distributed computer environment. Today, major software makers are fostering an object-oriented view of distributed computing. Any graphic user interface engine apropos to a distributed computer environment will work for such an application and every reference herein to JAVA is intended to include all such engines.

One reason for designating Java as one of the several engines available for this application is that JAVA is a programming language expressly designed for use in the distributed environment of the Internet. It was designed to have the "look and feel" of the C++ language, but it is simpler to use than C++ and enforces an object-oriented programming model. Java can be used to create complete applications that may run on a single computer or be distributed among servers and clients in a network. It can also be used to build a small application module or applet for use as part of a Web page. Applets make it possible for a Web page user to interact with the page.

JAVA has portability within a network. The source program is compiled into what Java calls byte code, which can be run anywhere in a network on a server or client that has a Java virtual machine. The Java virtual machine interprets the bytecode into code that will run on the real computer hardware. This means that individual computer platform differences such as instruction lengths can be recognized and accommodated locally just as the program is being executed. Platform-specific versions of your program are no longer needed.

The code is robust, here meaning that, unlike programs written in C++ and perhaps some other languages, the Java objects can contain no references to data external to themselves or other known objects. This ensures that an instruction cannot contain the address of data storage in another application or in the operating system itself, either of which would cause the program and perhaps the operating system itself to terminate or "crash." The Java virtual machine makes a number of checks on each object to ensure integrity.

Java is object-oriented, which means that, among other characteristics, an object can take advantage of being part of a class of objects and inherit code that is common to the class. Objects are thought of as "nouns" that a user might relate to rather than the traditional procedural "verbs." A method can be thought of as one of the object's capabilities or behaviors. For these reasons, JAVA stands as one among the candidates for operation as the Graphic User Interface.

Extending from the Graphic User Interface Generator 70 to the Networking Infrastructure 75 is a Structured Data Exchange 72. The Structured Data Exchange 72 is the mediating language between the several legacy systems within the distributed computer environment. If the Graphic User Interface 70 is the two-way communications portal between the system and the individual user, there must be a translation means between the uniform language of the graphic user interface 70 that will interpret the signals the interface generates into requests for the legacy programs as objects.

One means of enabling this system is to "objectify" the legacy programs. If a user click on a screen evokes the projection of the parts catalogue on the screen, the Graphic User Interface Generator 70 will generate a code in terms that will generally be uniform over the page. Once the code identifies a function, the Structured Data Exchange 72 develops a uniform means of packaging the request as a request for an object. Doing so requires two things to occur. First, the system designer must make the requests uniform across all platforms. Second, the responses to those requests must be uniform across all platforms. If, for instance, there exist two definitions for a part (distinct as it appears in each of two legacy programs), that part must have a definition that reflects one or the other of the definitions, or, itself, is a third definition. Implicit is a lookup table that allows the translation of uniform part definition into the remaining definitions necessary so that the part in one program means the part in another program and means the part across the system. The Structured Data Exchange 72 will use that uniform language.

The network infrastructure 75 is any such network structure as in common use. In information technology, a network is a series of points or node interconnected by communication paths. Networks can interconnect with other networks and contain sub-networks.

The most common topology or general configurations of networks include the bus, star, and token ring topologies. Networks can also be characterized in terms of spatial distance as local area networks (LAN), metropolitan area networks (MAN), and wide area networks (WAN).

Another classification for a given network is the type of data transmission technology in use on it (for example, a TCP/IP or Systems Network Architecture network). The network might carry voice, data, or both kinds of signals; the network might be public or private; the network might be either dial-up or switched, dedicated or non-switched, or virtual connections; and by the types of physical links (for example, optical fiber, coaxial cable, and Unshielded Twisted Pair). Large telephone networks and networks using their infrastructure (such as the Internet) have sharing and exchange arrangements with other companies so that larger networks are created. All of these are possible platforms for this system; each platform is qualified by using appropriate protocols.

The network is the central trunk of the system. The several components, the browser 68, the graphic user interface 70, and the structured data exchange 72, have as their purpose the translation of the user requests to computer-readable requests on the network 75. The remaining components have a rough symmetry in purpose, facilitating communication between the legacy servers 90 and the network interface 75. Set forth in the diagram are several of the most common means of facilitating the conversation between these legacy servers 90 and the network 75.

CORBA is a very common means of "wrapping" legacy software.

Common Object Request Broker Architecture (CORBA) is an architecture and specification for creating, distributing, and managing distributed program objects in a network. It allows programs at different locations and developed by different vendors to communicate in a network through an "interface broker." CORBA was developed by a consortium of vendors through the Object Management Group (OMG), which currently includes over 500 member companies. Both International Organization for Standardization (ISO) and X/Open have sanctioned CORBA as the standard architecture for distributed objects (which are also known as components). CORBA 3 is the latest level.

The essential concept in CORBA is the Object Request Broker (ORB) 80. ORB 80 support in a network of clients and servers on different computers means that a client program (which may itself be an object) can request services from a server program or object without having to understand where the server is in a distributed network or what the interface to the server program looks like. To make requests or return replies between the ORBs 80, programs use internal API's 78, either the General Inter-ORB Protocol (GIOP) and, for the Internet, its Internet Inter-ORB Protocol (IIOP). IIOP maps GIOP requests and replies to the Internet's Transmission Control Protocol (TCP) layer in each computer. An application program interface ("API" and sometimes spelled application programming interface) is the specific method prescribed by a computer operating system or by an application program by which a programmer writing an application program can make requests of the operating system or another application.

Another means of connecting legacy servers 90 to the network through wrappers 86. In programming, a wrapper 86 is a program or script that sets the stage and make possible the running of another, more important program. Wrappers 86 can "objectify" legacy programs. By wrapping the access to these legacy servers, the servers operate within their own environment while the wrappers may simulate the interactions that a logged in user would normally supply to the system. The wrapper 86 mediates the language of the legacy server 90 and the structured data exchange 72.

Still another means is to work around the legacy software by creating a data browser. For many high level data sets, such as those constructed in a computer assisted drafting program, it is not necessary to invoke all aspects of a very complex software, nor is it desirable. Once the design engineers have fully defined the product, access to the design plans should be on a read only basis. Data browsers 84 look past the software to the data to inform the system. Autodesk® offers such a viewer known as Volo View®. It is within the scope of programmers skilled in the art to readily draft source code for such viewers.

Figure 3:
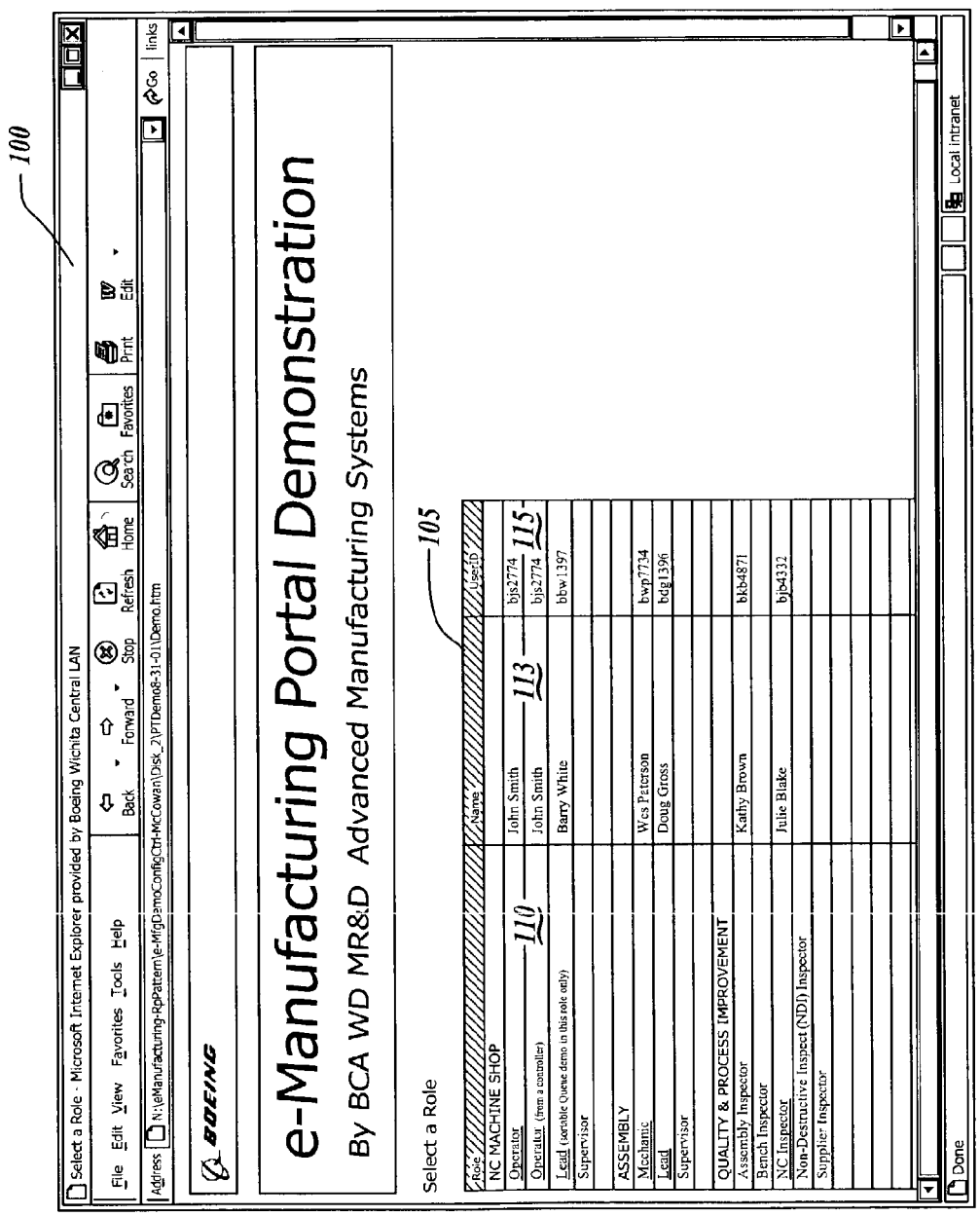
FIG. 3 is a screenshot of the system administrator's basic security and role implementation of the invention.

FIG. 3 presents the role definition screen to the system. As indicated above, the paradigm for the system is to wrap the factory around the skilled employee as a complete interface. Wrapped within that paradigm is the idea of security. While optimizing delivery of information, the inventive system still only provides information on a "need to know" basis. To that end, an administrator must define each user to the system. Roles define each user. The roles necessary to the construction of even complex machinery are well-known and are the subject of project engineering. Gantt charts and the attendant critical path study demonstrate the knowledge of the roles necessary to manufacture a product.

For each user logging on to the system, the system must impart security levels for each of the legacy servers consistent with the user's role in production. Each role evokes a constellation of log-ins to the several servers unique to that role. With each of the legacy servers, there exists a level of access and that level of access might be variable across the servers.

The role definition screen as portrayed in FIG. 3 allows a system administrator access through the browser 68 with a standard browser screen 100. On that screen, the administrator defines an association between a user and the roles appropriate for that user. In a preferred embodiment, the roles are displayed in a matrix, as shown 105. The matrix is a detail view of the look-up table. In this instance, the matrix portrays some of the NC Machine Shop Operators, the Assembly Mechanics, and the Quality Improvement Inspectors. Among the names set out as an example is the operator 110, John Smith 113, with the log-on user account bjs2774 115. The association between these three identity elements role-name-user account, defines the constellation of security rights for John Smith. Beyond that, as Mr. Smith is an operator the computer now knows a great deal more about him.

When Mr. Smith logs in on a job, the computer knows what assignments Mr. Smith will receive. Beyond that, because of associations stored within the computer between assignments or tasks and tools, the computer is aware of the necessary tools and materials. Still further, the computer can provide, at the browser detailed pictorial instructions showing the best method stored therein for completing the task. The computer obviates the needs to sign into the tool crib to check out tools, to request materials for the task, to requisition cutters, and to look up assembly instructions. All of this is possible because of the association between Mr. Smith and his role.

Figure 4:
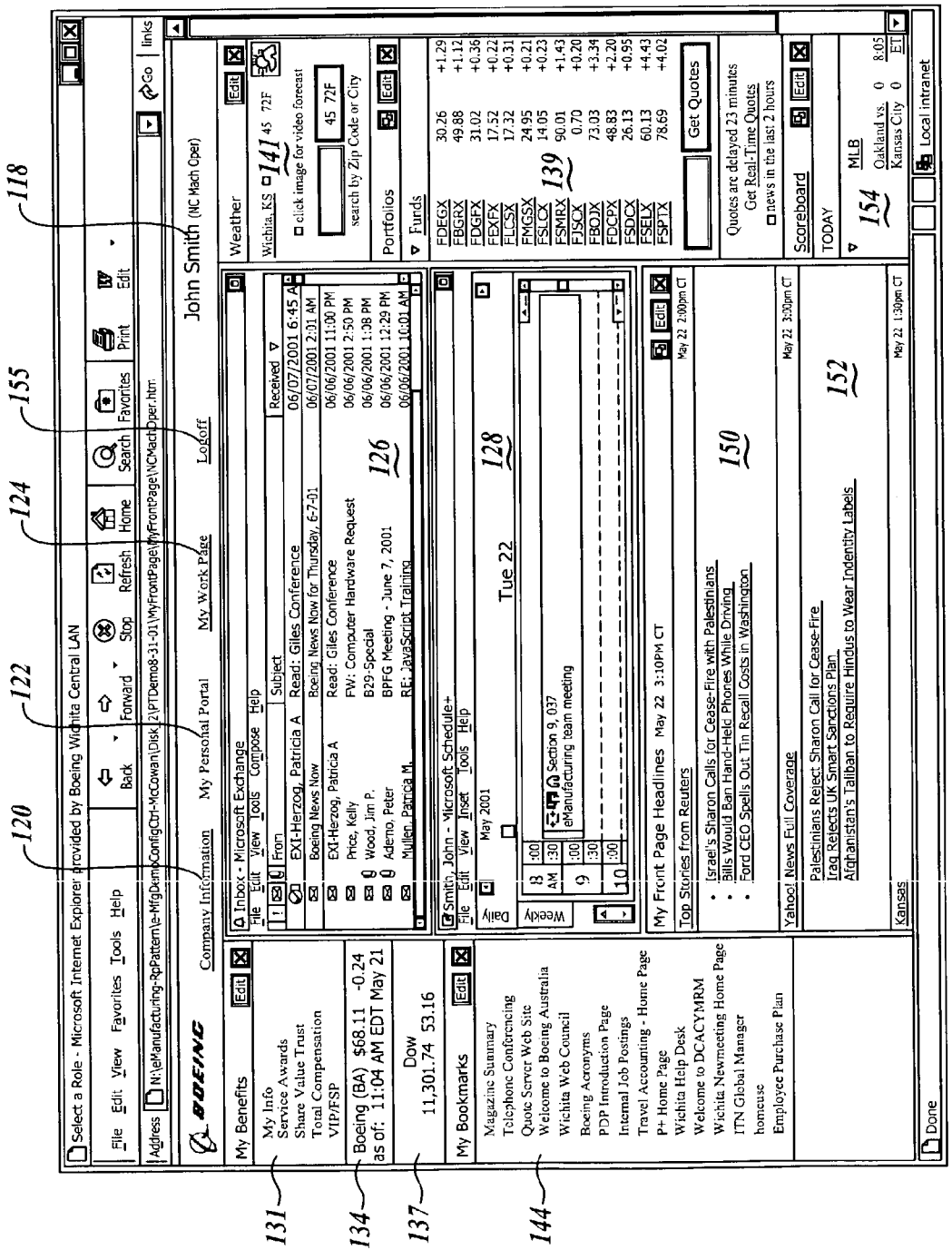
FIG. 4 is a screenshot of the personal portal implemented within the invention displaying the human resource and internal administrative support possible.

FIG. 4 portrays one of a number of screens of the system after Mr. Smith, or any user, should log on. The elements available exemplify the paradigm of wrapping the factory around the skilled employee, in this instance, this is the personal portal of John Smith 118. This is the personal portal for the system. This is one of the several portals available including the Company Information 120; the Personal Portal 122; My Work Page 124; and a Log-Off Page 155. The contents of this Personal Portal page are personal to Mr. Smith.

Within this page are many of the elements set forth to assist and to organize the employee. Primary among these is the organizer element comprising the e-mail browser 126 and the calendar 128. In this embodiment, the elements draw from software such as Microsoft Exchange® 126 and Microsoft Schedule+ 128, though any commercially available software would serve with equal facility.

Apart from the several organizer elements, the Personal Portal is user-customizable. Mr. Smith 118 has included links to his benefits page 131 from the Human Resources Department; the Company Stock ticker 134; the Dow Smith Index ticker 137; and a series of bookmarks 144. He has also added news links such as Reuter's Headlines 150; Yahoo News 152; the local weather 141; his personal investment portfolio 139; and the box scores for Kansas City 154. Each of these choices and many others are configurable by the user to maximize the utility of the page. Just as many internet web services allow for the customization of a home, the same technology allows employees here to constitute their personal web pages.

Figure 5:
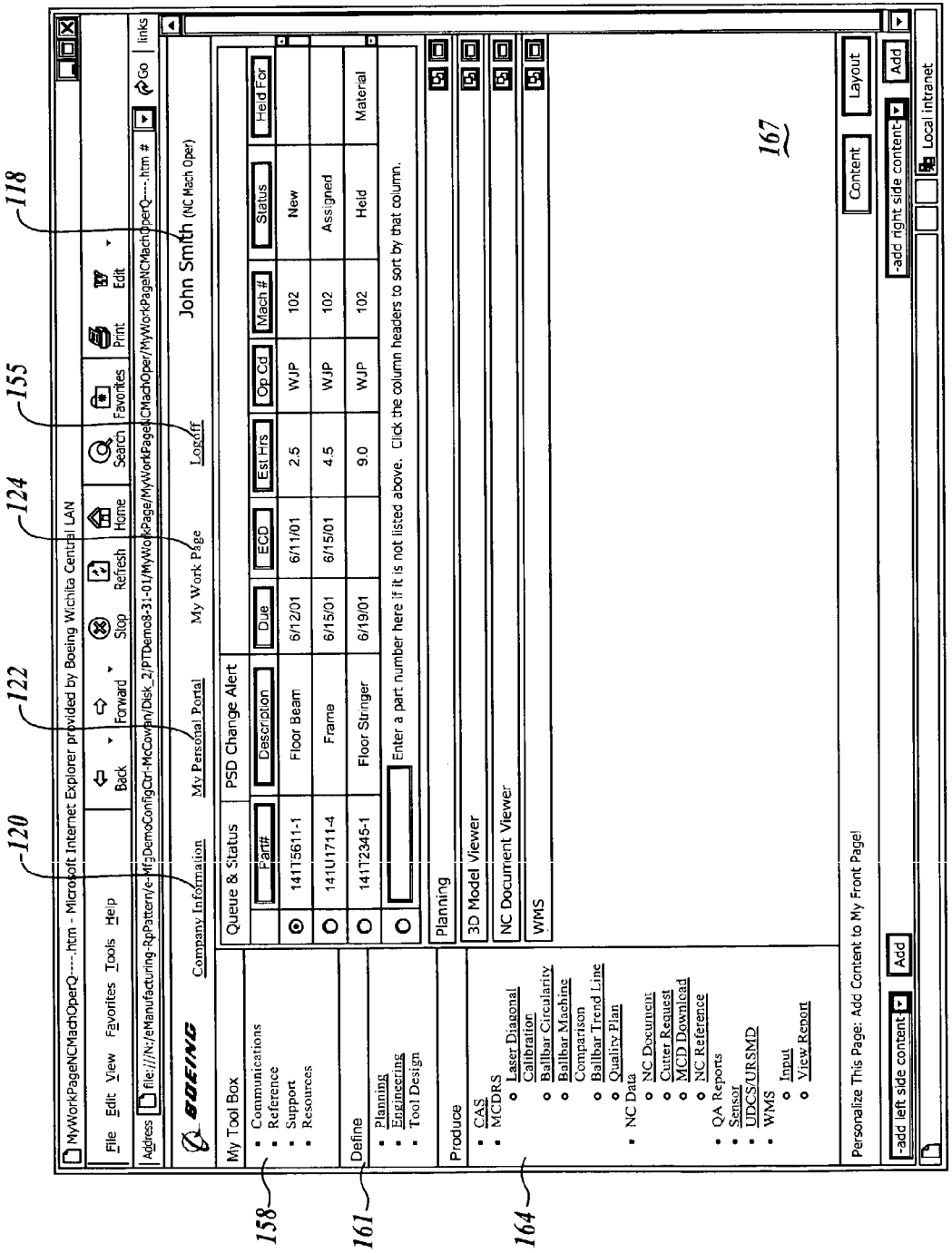
FIG. 5 is a screenshot of the catalogue of parts along with complete descriptions attendant to a particular fabrication procedure.

FIG. 5 shows another of the portal pages, My Work Page 124, directed at the performance of the assigned tasks, My Tool Box 158. Through this portal 158, the employee can summon information necessary for the operations that the role comprises. On the page, are opportunities to call up references, support, and resources. Among the resources are explicit the data from the Define server 161, and all of the servers to assist Production 164. Each of the data sources necessary for production are available by simple selection from the menu presented there. One such server is the part catalogue 167.

The part catalogue 167 automatically serves the necessary part information for each task as the employee logs onto that task. For any single part, the catalogue can present the part number, a verbose description, a due date, an estimated completion date, book time for production, an operation code, and the assignment to Mr. Smith, the status report, and for whom the part might be held. This information would normally exist in manuals or in stovepipe information systems at the assignment desk for reference. By lowering the threshold to this information, the manufacturer assures the ease of checking. Lowering this threshold, in turn, assures better quality control.

Figure 6:
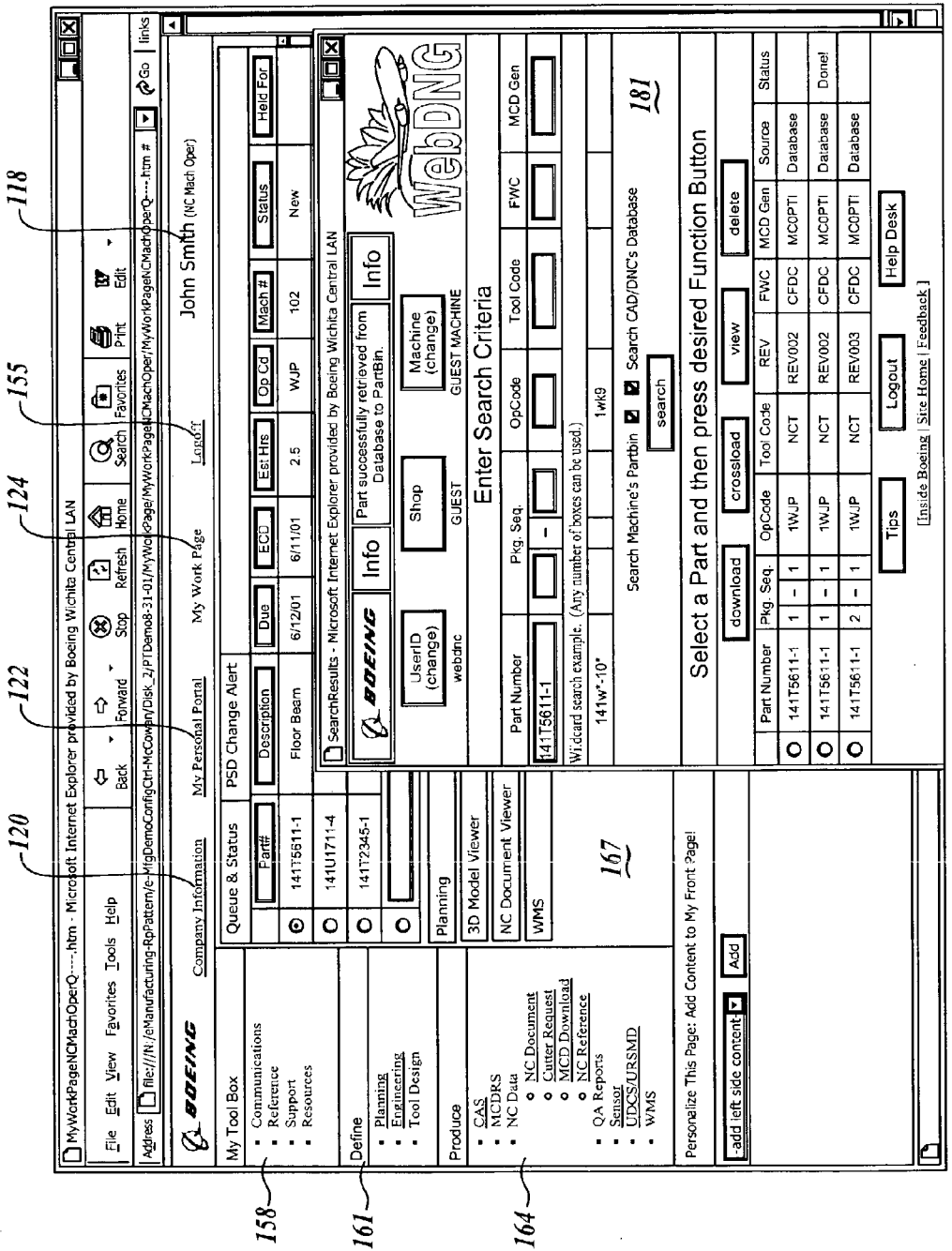
FIG. 6 is a screenshot of the detail from the catalogue of parts along with the several functions of the invention attendant to that part.

FIG. 6 demonstrates how greatly the system enhances the "standard" content in parts manuals. Shown at 181, the system presents Mr. Smith with the opportunity to download machine control data according to the specifications, the views, and other functions attendant to fabrication. Again, the computer anticipates the needs of the employee and, in this instance, downloads the data to control the Distributed Numerical Control (DNC). Indeed, the browser would enable the direct control of the machinery in accord with the method taught and incorporated through reference to the application entitled, "System, Method And Computer-Program Product For Transferring A Numerical Control Program To Thereby Control A Machine Tool Controller" Ser. No. 09/864,496 as referred to above.

Figure 7:
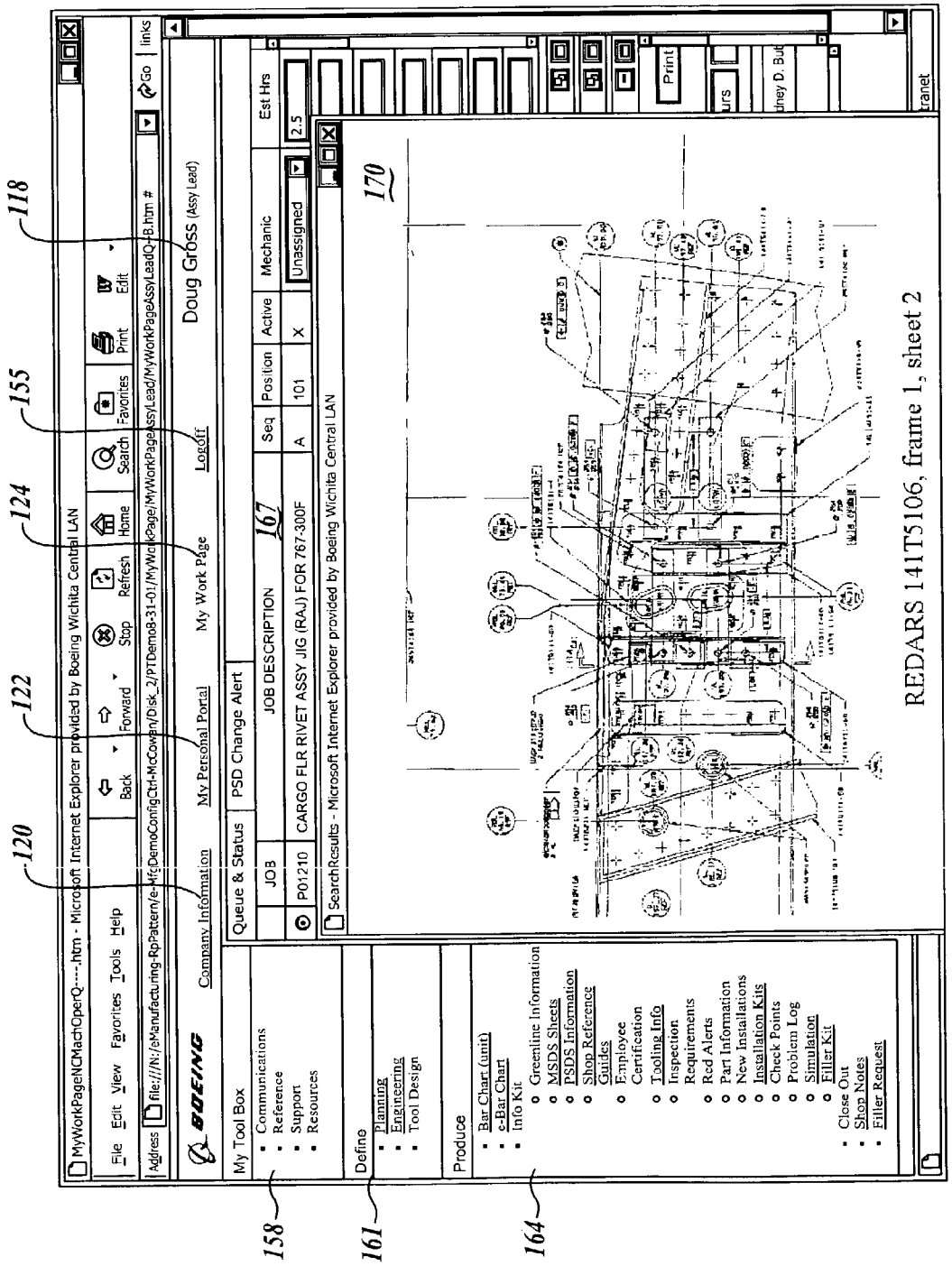
FIG. 7 is a screenshot of the numeric control data for an individual part as downloaded from the Numerical Control Data Server.

FIG. 7 demonstrates the capability of the browsers to portray product definition or CAD data in view mode 170. The view mode 170 displays the several dimensions and placement of the multiple hole sites comprised in the completed part. The information portrayed is essential in completing the task and would normally be stored in a distinct file from the manual in the parts catalogue. Again, by lowering the threshold to the information, the system assures the quality of the product.

Figure 8:
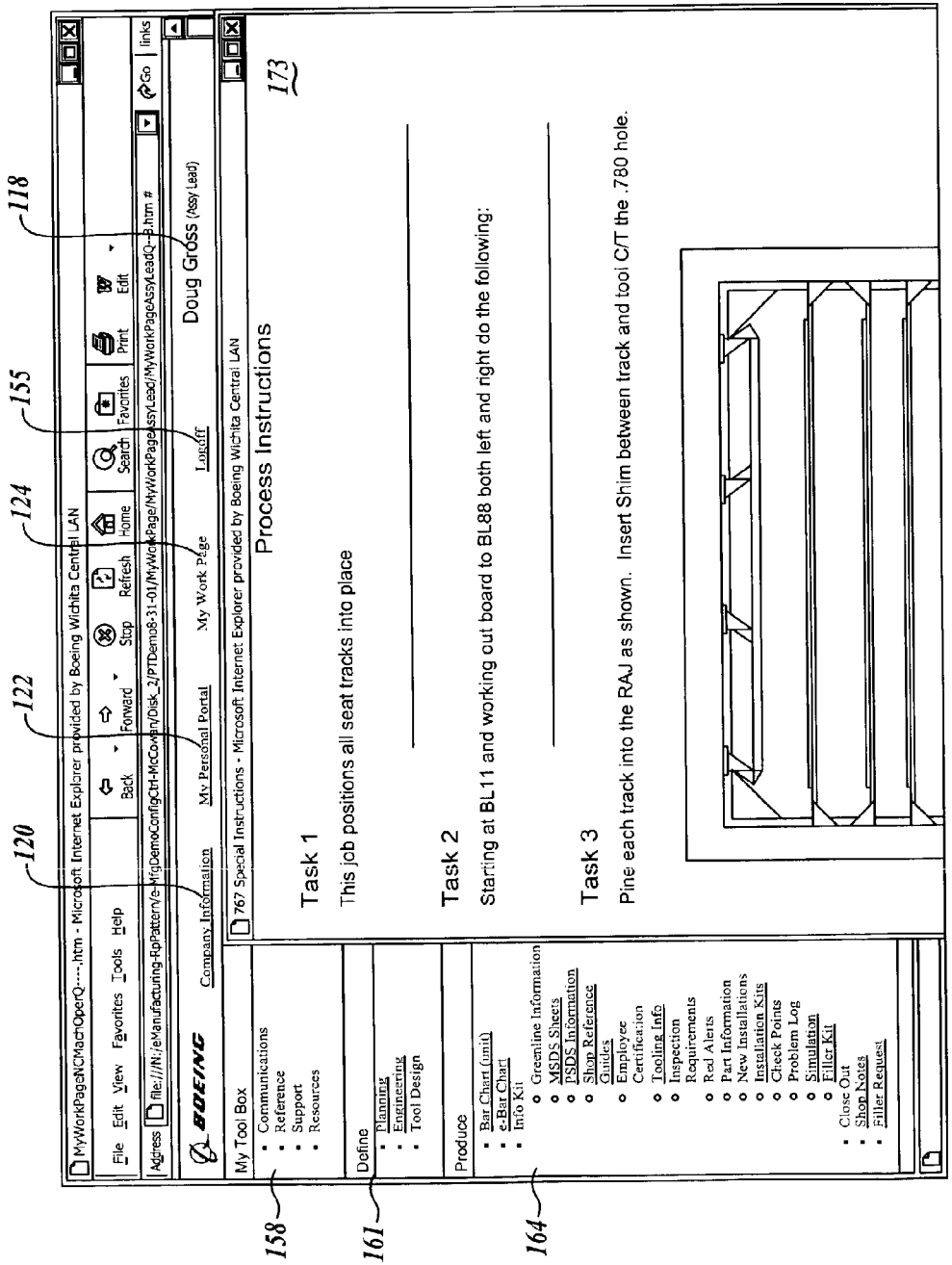
FIG. 8 is a screenshot demonstrating the ability of the inventive system to augment the part information with the inclusion of pictorial assembly instructions for an individual part.
Figure 9:
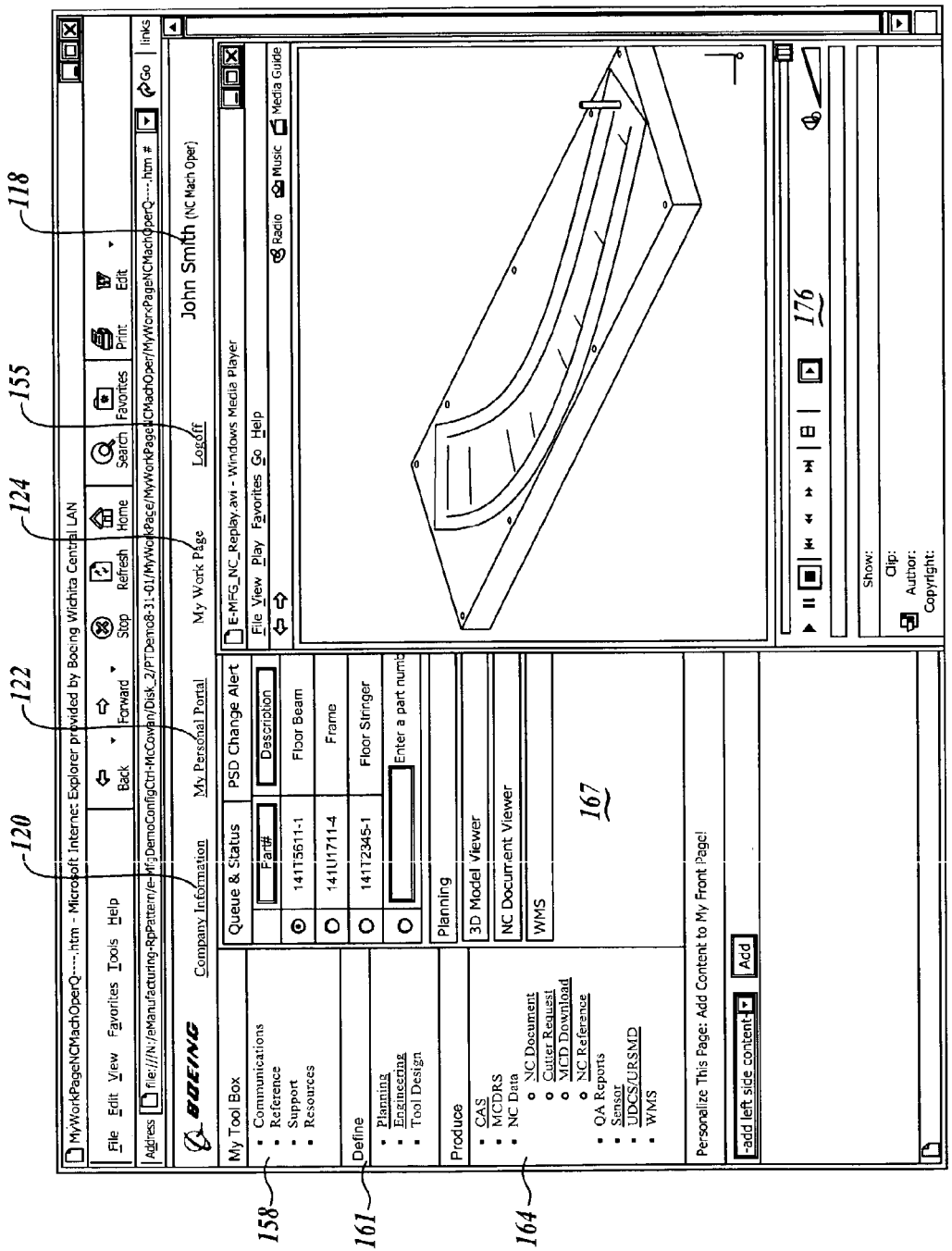
FIG. 9 is a screenshot of a three-dimensional panning movie portraying all sides of a subassembly.

Not only will the system inform the actions of machinists and machinery operators but also those assembling the various machined parts. FIG. 8 portrays the actual placement of the parts with instructions filled with photographs 173. Where a view of the part is necessary, the system will provide a movie, with or without an audio stream, of the part as it rotates in three-dimensions 176 in FIG. 9.

Figure 10:
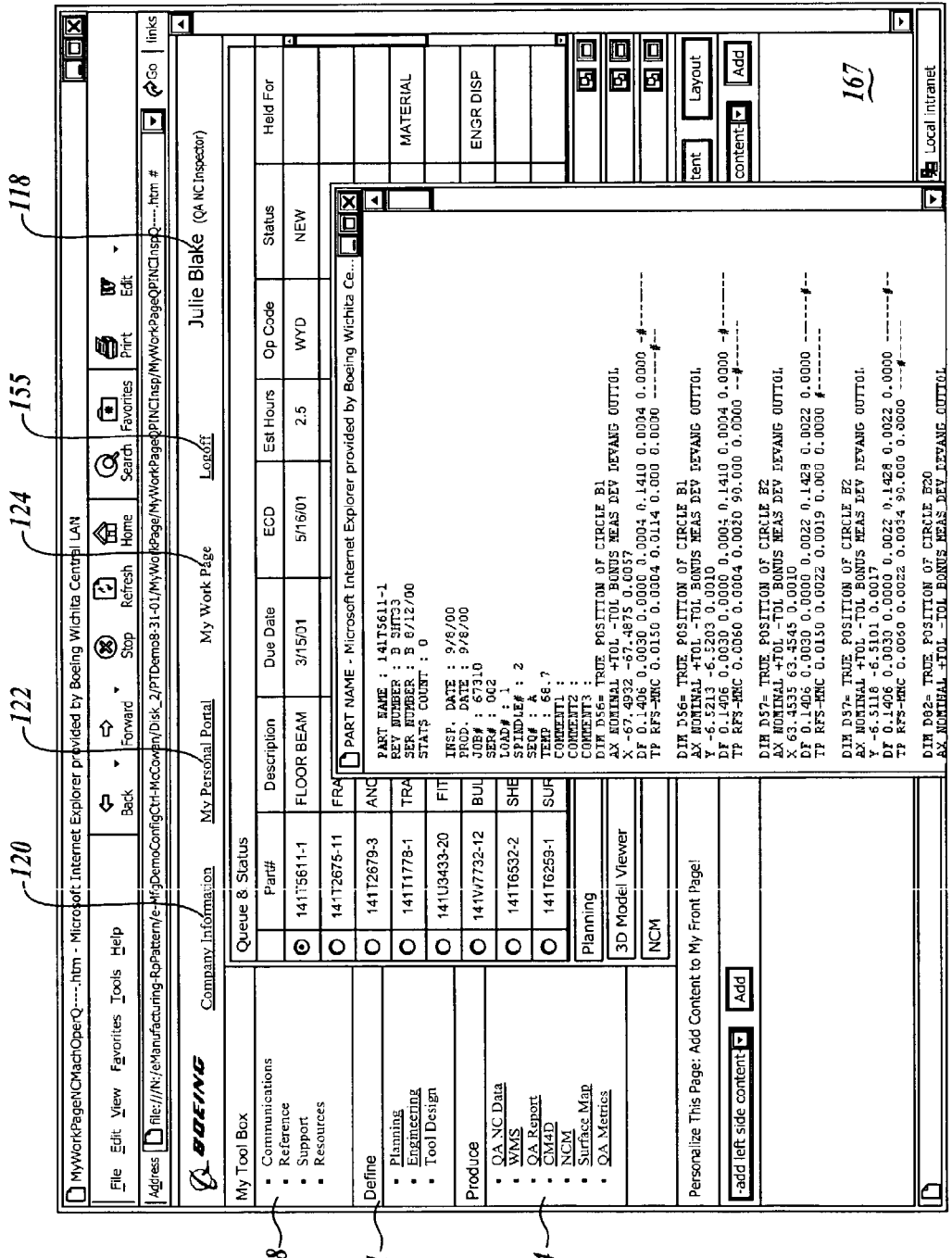
FIG. 10 is a screenshot of the report to the machine operator of the quality control inspection result of the assembly of the particular assembly procedure.

When the operator has machined, formed, or fabricated an assembly, the operator rarely had access to the quality control data generated when inspectors measure the machined, formed, or fabricated assembly. In FIG. 10, the operator reviews the quality control report 184 as quickly as the inspectors generate it. Consider the hypothetical situation where a stepper motor consistently binds in one position, thereby offsetting slightly the locations of holes in the work piece. With the inventive system, the operator can readily detect the variance from the intended locations and then make repairs or adjustments to remedy the condition of the machinery.

Figure 11:
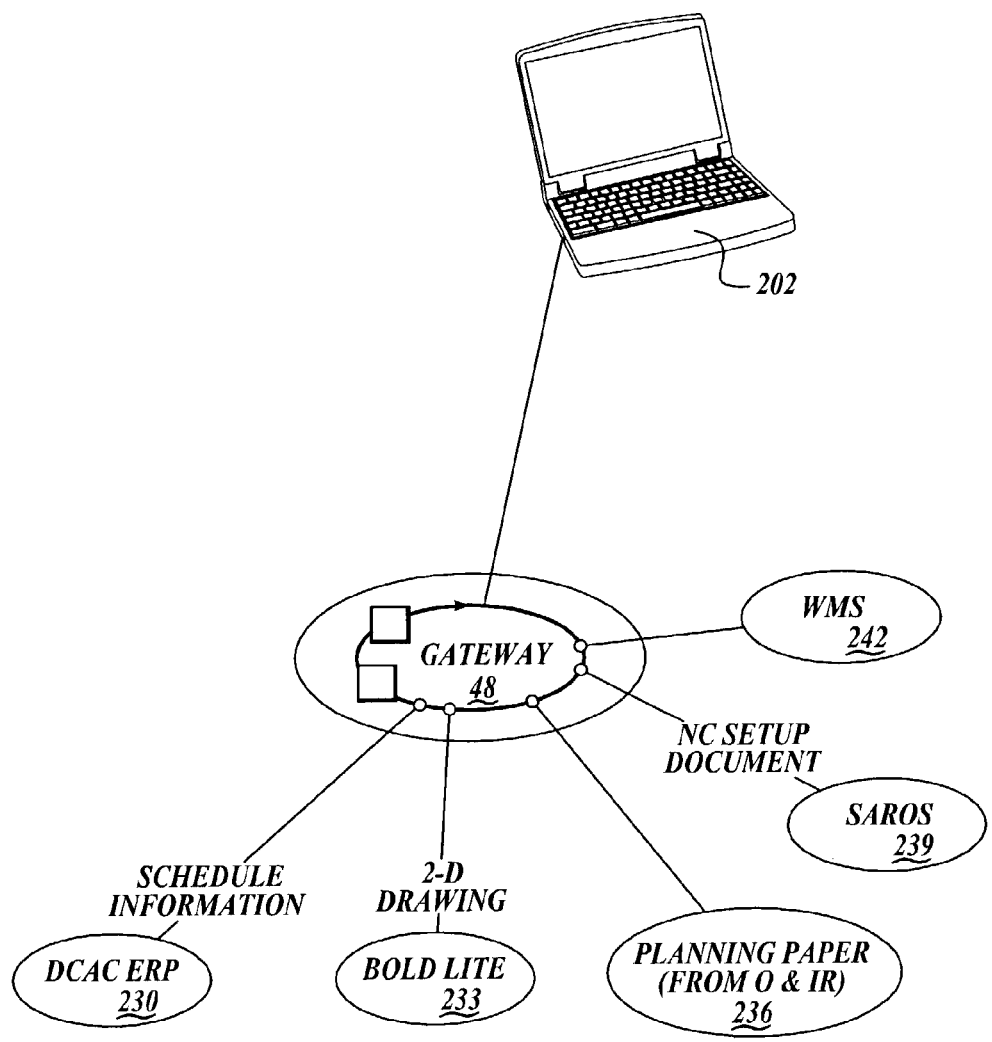
FIGS. 11-14 portray the information available from the constellation of servers available to the various example roles in product integration to further the completion of their responsibilities within the factory.
Figure 12:
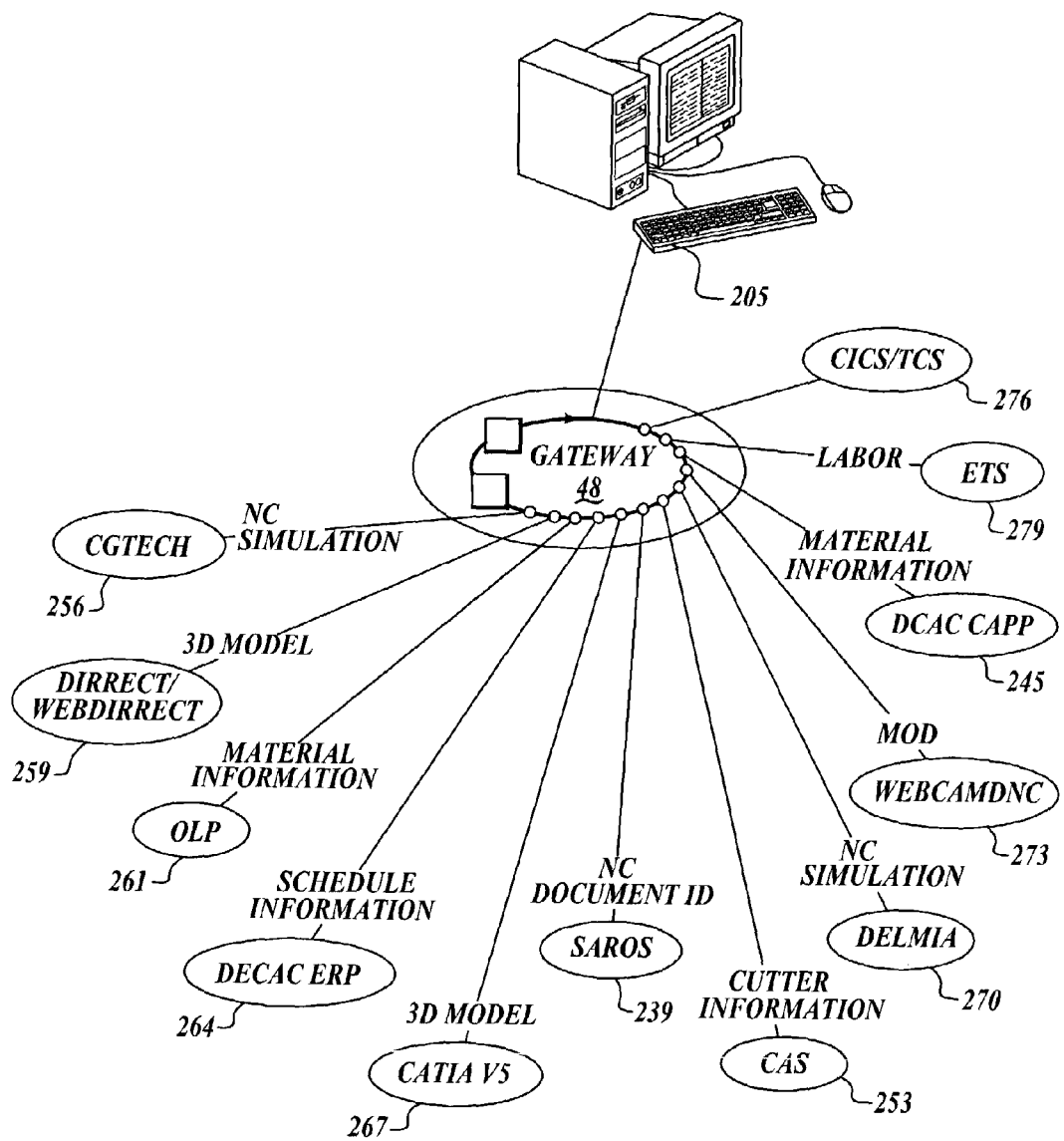

FIGS. 11-14 show the underlying topography that allows the presentation of information according to roles. FIG. 11 portrays the access allowed the resource planner. Using his laptop computer, the setup technician draws down information from the resource-management software-server, in this case DCAC 230. Define and Control Airplane Configuration 230 refers to that software used to simplify and improve internal processes for handling airplane configuration data. The Enterprise Resource Planning (ERP) system is currently being implemented within the Boeing Commercial Airplanes Group (BCAG) Specifically, Commercial Airplanes generates the data that defines a customer's requested configuration for an airplane by these processes. For example, the type of seats, galleys, lavatories, carpet, avionics, and engines, and uses that data to turn a "basic" airplane into one that has the customer's particular configuration. From the BOLD Lite® server 233, the resource planner receives the two-dimensioned drawings defining placement of specialized components within the airplane. Planning Papers designating the sequencing of assembly procedures come from the O & IR server 236. Other such servers exist for SAROS® data 239 and the workcenter management system (WMS) 242.

Similarly, when the Numeric Control programmers sign onto their desktop computers 205, they are given access to data found on dozens of servers: CGTech 256 for simulation data; DIRRECT/WebDIRRECT 259 for 3-Dimensioned models; OLP 261 yields material data; DCAC 264 for scheduling information, etc.

Figure 13:
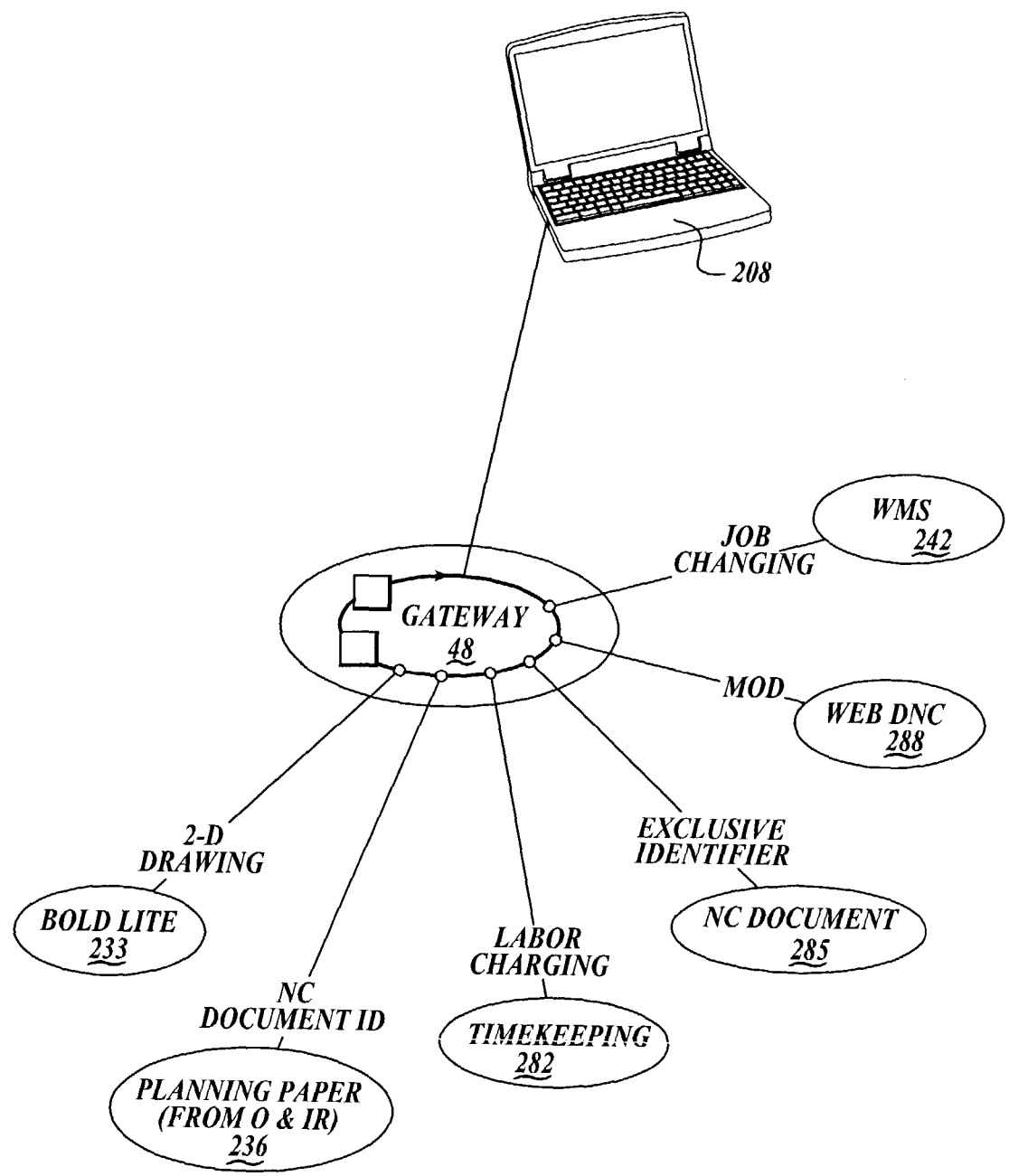
Figure 14:
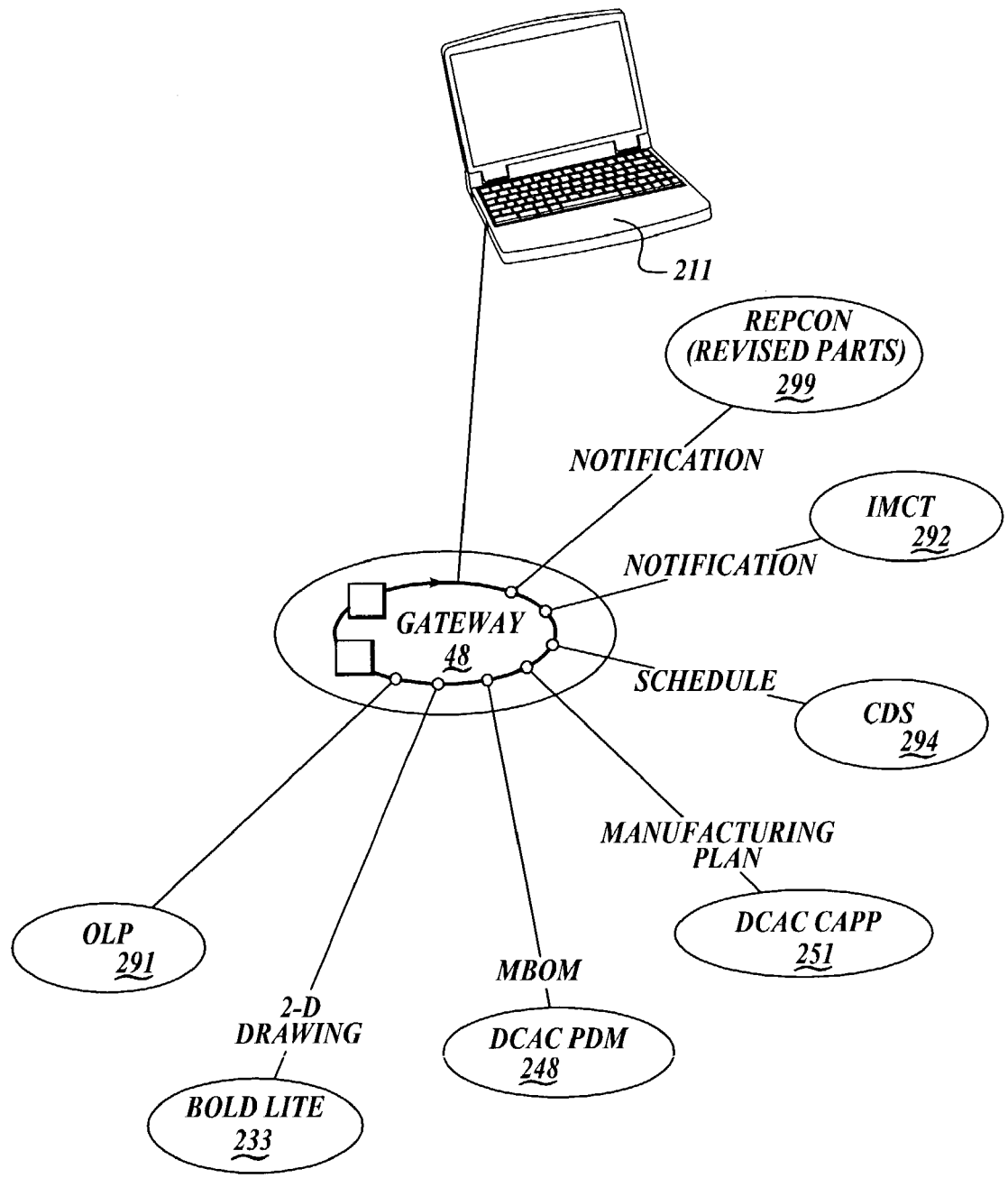

The utility theme continues for the NC Machine Operator, such as Mr. Smith from our example. FIG. 13 portrays this topology again as deployed for Mr. Smith. Mr. Smith logs on through his laptop 208 onto the gateway 48 to get the access unique to Mr. Smith's needs. The constellation of servers will allow Mr. Smith to log onto the job with Timekeeping 282; to get materials from workcenter management 242; and, all of the data from the necessary servers 233, 236, 285 and 288. As a final example, though not intended to limit the range of the uses for the system, FIG. 14 presents servers available to Mr. Smith's lead machinist. This, too, is a unique constellation of servers available according to the known needs of the lead machinist.

As previously stated, the paradigm of the inventive system is to wrap the individual employees in a single unified interface allowing them to interact with the factory through a single unified browser portal. Understanding this paradigm, one can readily see that remote construction is possible by full exploitation of the inventive system. By use of this remote construction, skilled employees can be isolated from the environmental concerns of the shop floor. Where, for instance, noise or the presence of noxious fumes are a concern, the invention will allow these skilled employees to work removed from the noise or fumes. Indeed, where the vagaries of the labor market require it, the manufacturer might hire the skilled employees in an area where such employees are available, and the manufacturer might provide a remote factory control center close to the employee's residence while the work is done on a shop floor thousands of miles away.

Not only does the system curtail and tailor permissions, access and security for the various users, but additionally, the process can automate all of the necessary administrative support for their work. Inherent in the system is not only the knowledge of who is using the system, but for what they wanted to use it. To aid them in that, the system will log them onto and off the various servers necessary based upon the principal log-in. Extending that same principle, the system can order tools without waiting for the specific order from the user. The system optimizes the employee's tasks to the employee's skills, assuring the satisfaction and morale of the employee.

Figure 15A:
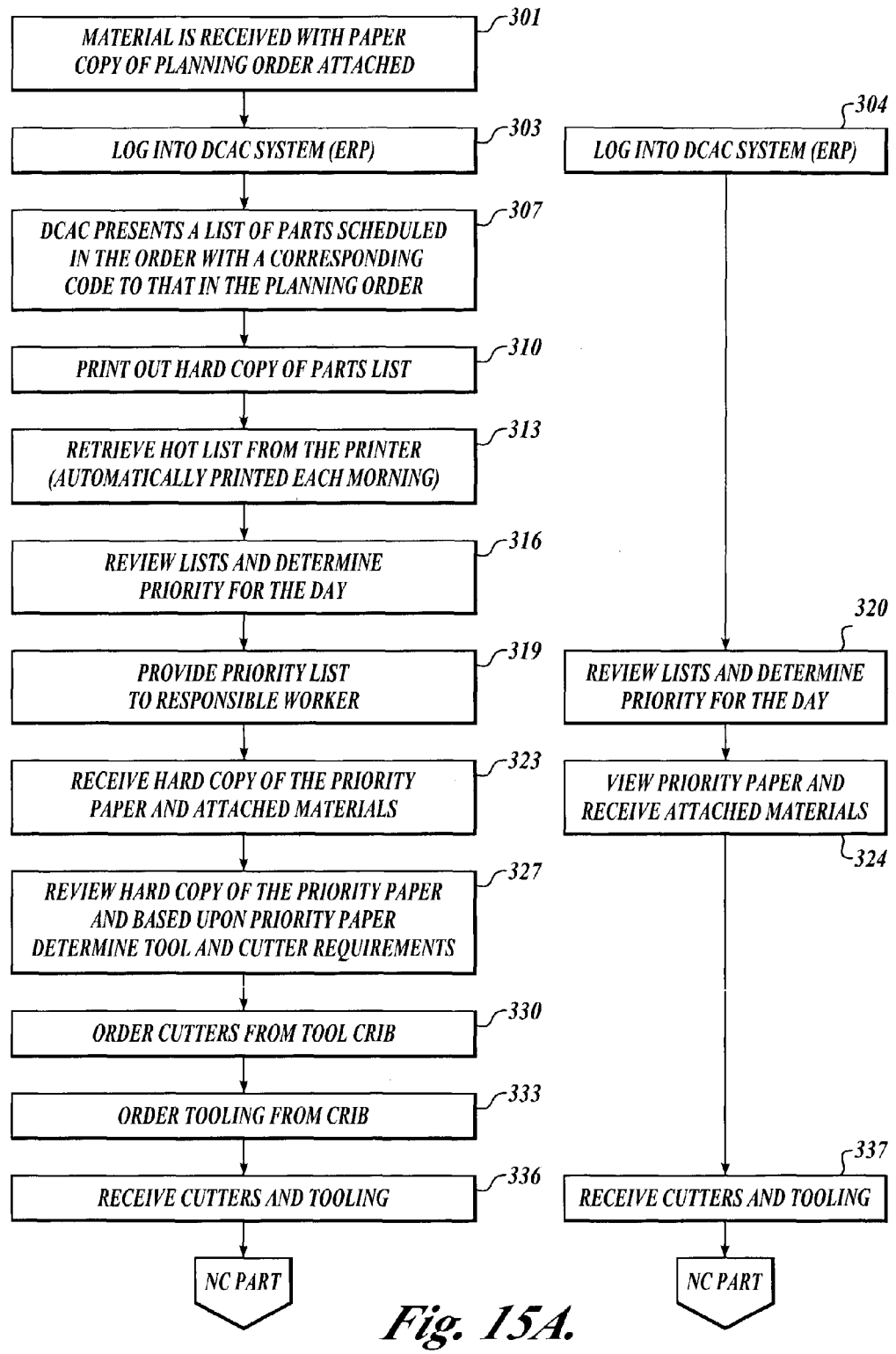
FIG. 15A portrays the first portion of a parallel comparative presentation of the procedures employed by a machinist contrasting the pre-invention to the post-invention procedures.

FIG. 15A shows how the system can streamline the tasking of the employee. Rather than require the employee to physically secure a paper work order 301, the employee proceeds directly to logging on to the system 304, just as that employee does currently 303. Rather than to, again, separately log onto the DCAC/MRM 303, to print out the parts list 310, retrieve the hard copy from the printer 313, review the printed list 316, and determine the priority of tasking for the day 319, Mr. Smith (the sample machinist), will only review the list presented to him on log on 320. That list will have the priorities for the day displayed in real-time. This real-time capacity allows the reassignment of priority in the course of production.

The advantages over the current system continue as the employee determines what cutter tools will be necessary. Rather than to review the hard copy of the priority paper 323 to determine the priority of tasks assigned, the employee needs only to view the screen projecting the priorities on screen, with the associated cutter tools 324. There is no need to review and discern the cutter tools necessary 327; there is no need to separately order cutters from the tool crib 330; order tooling from the crib 333. Nonetheless, Mr. Smith receives the necessary cutters both under the current system 336 and under the inventive system 337.

Figure 15B:
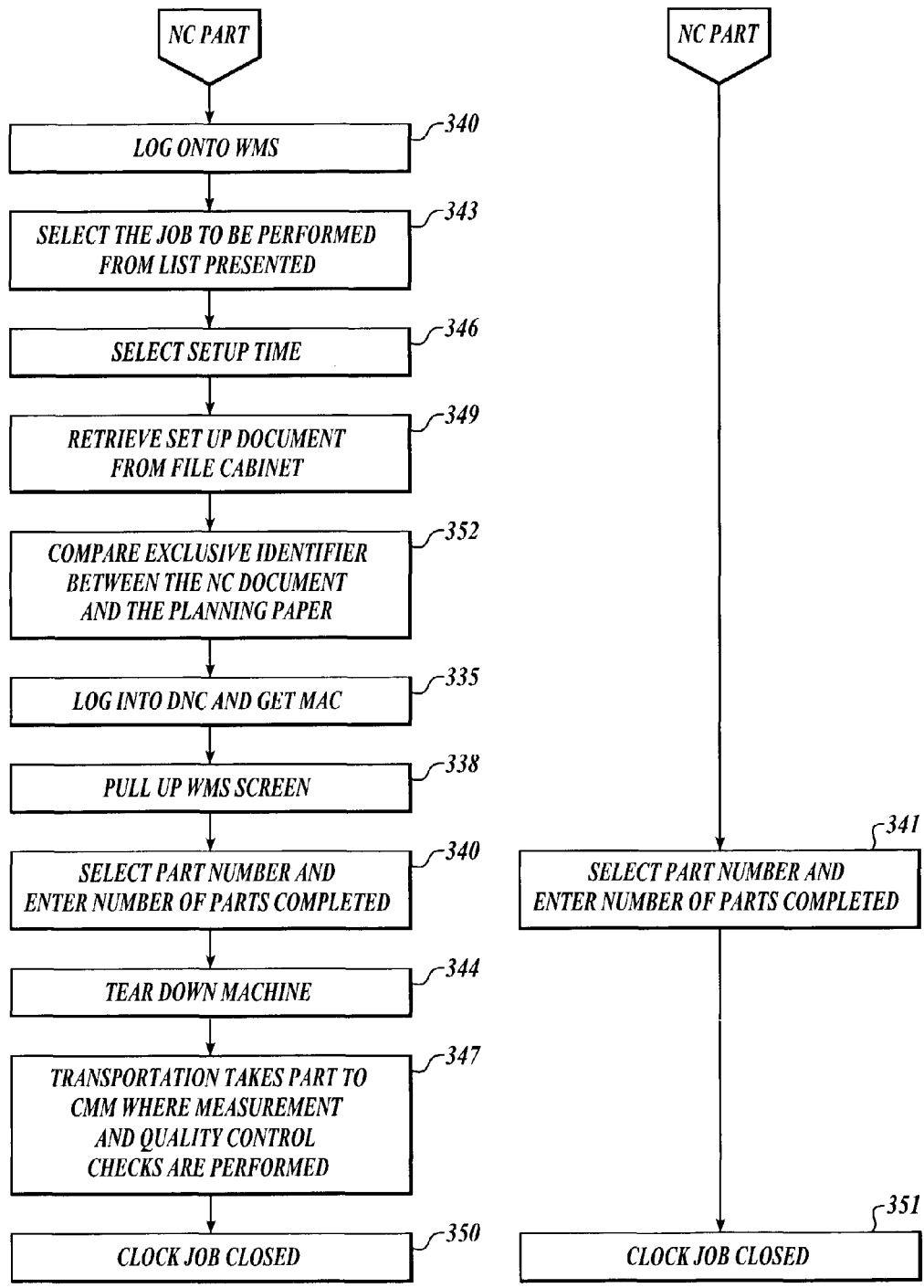
FIG. 15B portrays the second portion of a parallel comparative presentation of the procedures employed by a machinist contrasting the pre-invention to the post-invention procedures.

The process continues on FIG. 15B. The new system obviates the need to log-in onto the workcenter management system 340; to select the job 343; to select the set-up time 346; to retrieve the setup document 349; to check for correspondence between the part and the schematic 352. Additionally, the system removes the need for a separate log-in to the distributed numeric control server 335, and to view the workcenter management screen 338. Rather, Mr. Smith proceeds immediately to what would be the next step 340, to select the part number and enter the necessary number of parts 341.

Just as the system has automated the setup of the machine, so, too, the system automates the tear down of the machine thereby obviating the need for the tear down step 344. Similarly, the system transports the completed part to the next step 347. Finally, Mr. Smith can clock the job closed 350 and 351.

Figure 16:
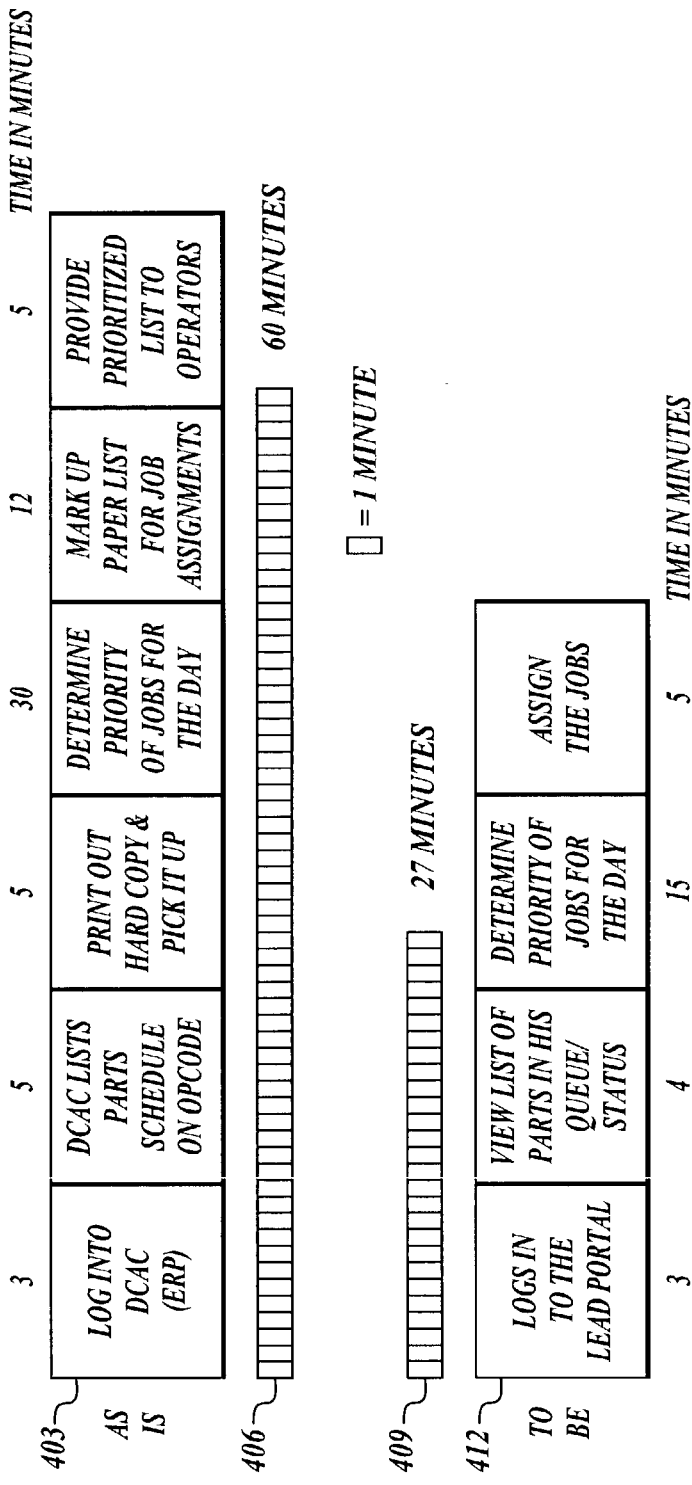

At the base of the system is the study of each task necessary for production of the product. These studies yield immediate savings in each of the studied roles. FIG. 16 shows, the savings for the Machine Shop Lead. The tasks with the administrative burden of the current tasking 403 show the process of assigning work. Under the current practice it takes 60 minutes. Using the inventive system to assign the work, only necessary steps remain 412, resulting in a savings of 33 minutes 409.

Figure 17:
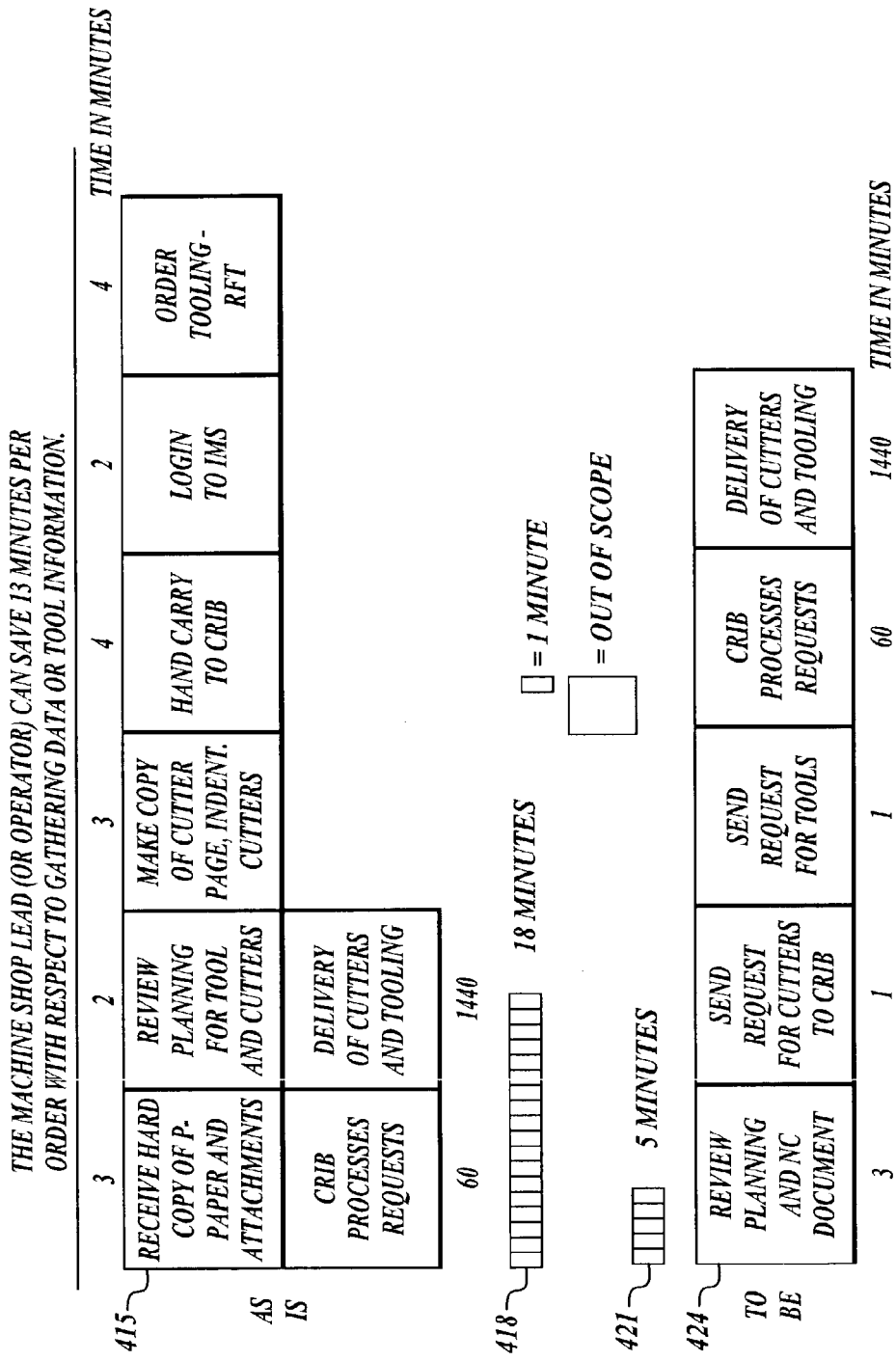
Figure 19:
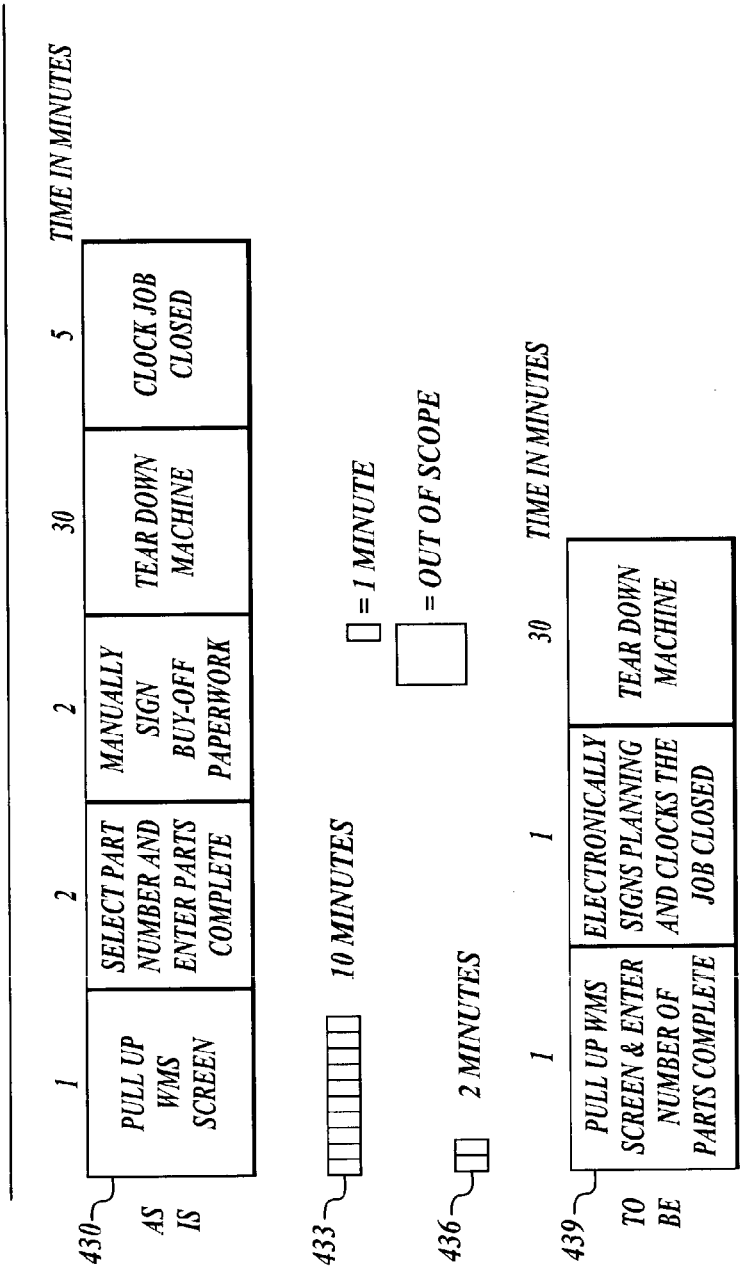

FIG. 17 portrays additional savings in ordering tooling and data. As currently practiced, the necessary tasks 415 require 18 minutes. With the automation of the inventive system, the remaining tasks 424 shrink to 5 minutes 421. FIG. 18 displays similar savings for the Machine Operator, taking tasks 427 amounting to 21 minutes 431 and shaving the tasks 437 to 9 minutes 434. FIG. 19 demonstrates that even logging off at the completion of the work presents timesavings. The tasks as currently practiced 430, take 10 minutes 433—as under the system the tasks 439, a mere two minutes 436.

Figure 20:
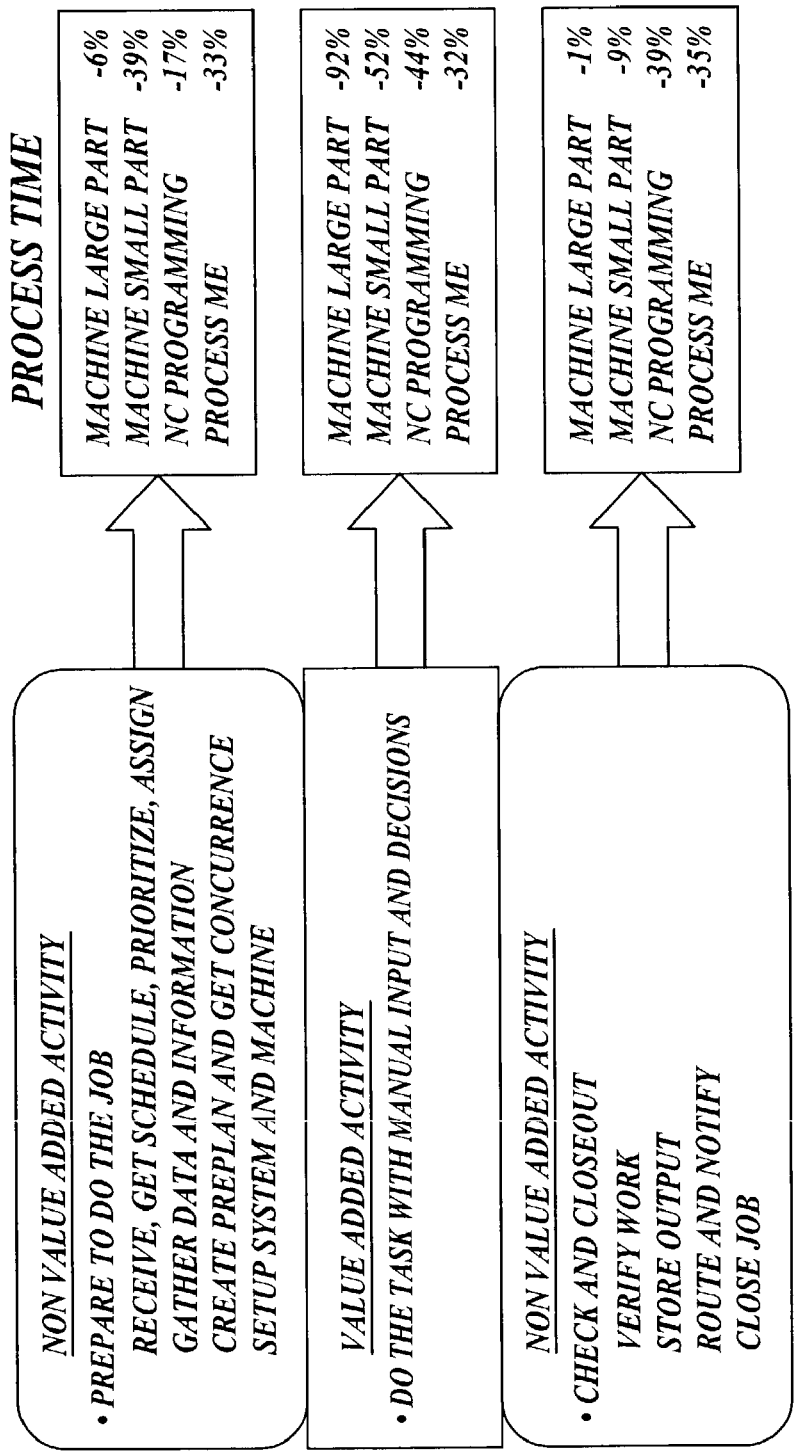
FIG. 20 summarizes the inventive approach and the resulting savings from the implementation of the inventive process and system; and, FIG. 21 portrays the process of optimizing the factory processes in light of the inventive capability.

The rationale for these economies is portrayed in FIG. 20. There are tasks that add value to a single piece or part. These tasks grant the greatest satisfaction to the employee. Similarly, there are tasks that are necessary to track the progress of parts and pieces through the factory, tools to and from the tool crib, the wear on expendable tools such as drill bits or cutters. Computers are ideally suited for such administrative tasks. The system places the burden of administrative tasks onto the computers.

Figure 21:
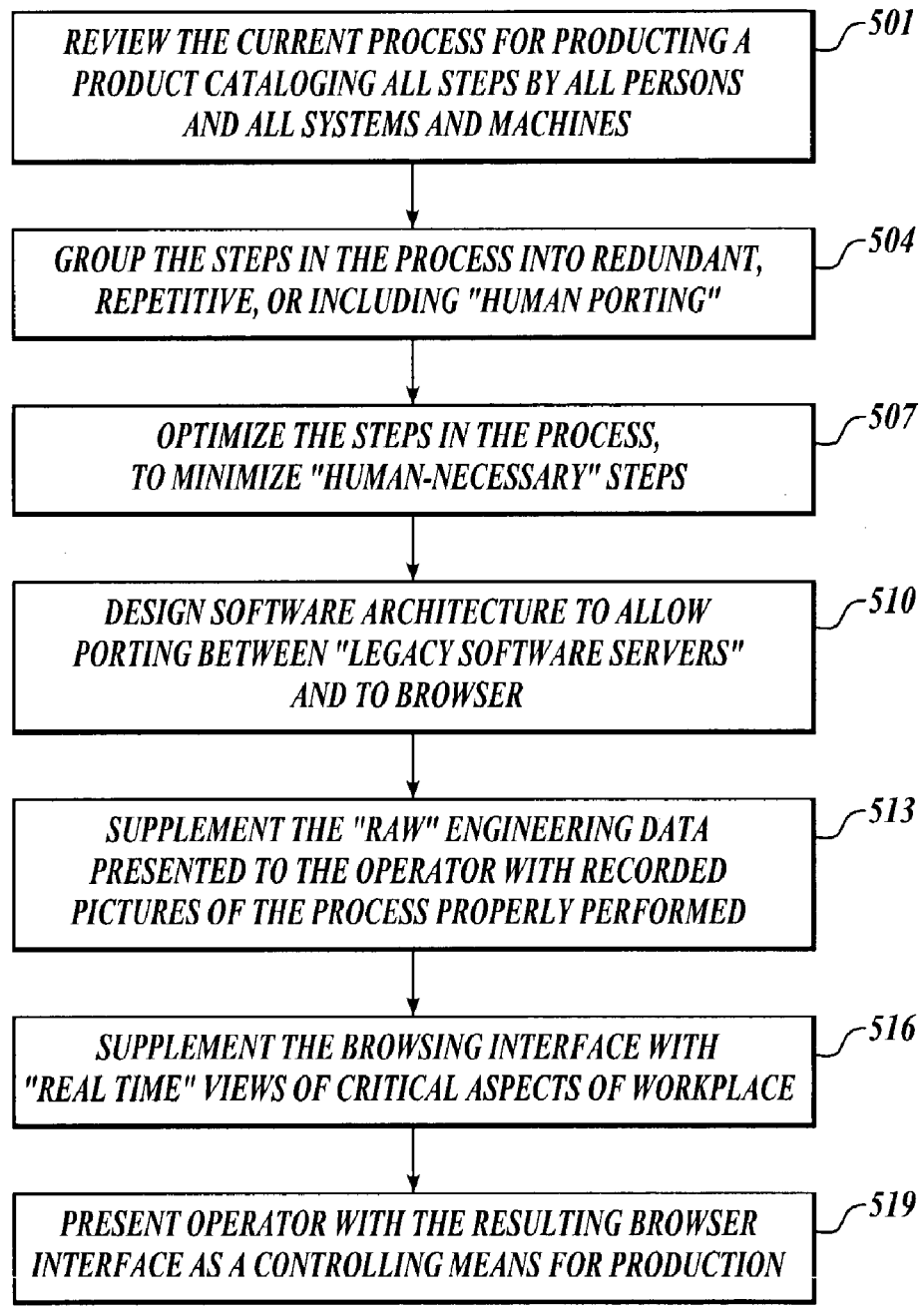

To achieve these economies, a method for study is necessary. FIG. 21 portrays the process. At 501, the process is examined, breaking each job into its component tasks. Understanding these tasks, they are grouped in a manner that separates the redundant, repetitive tasks from those that require the human input 504. Once the steps are known and separated, they can be optimized in a manner to minimize those steps that require human input 507.

As the human-necessary steps remain, the remaining and necessary steps must be programmed into the domain of the servers. Rather than to limit the role of the computers, the computers are used to allow the human users to luxuriate in the information available to allow the optimum performance of their work. Best methods of performance are recorded for representing to the employees 513. Through the provided browser interface, employees can have simultaneous views of the aspects of the workpiece necessary for proper placement 516. The browser allows the remote placement of the employee 519.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method, comprising assisting a worker in an aircraft manufacturing facility that includes automated machines and various legacy systems for machining parts, the method including:
   provide a computer interface at a computer system for allowing the worker to log in;
   automatically retrieve, by the computer system, an access role for the worker in response to the log-in;
   automatically determine, by the computer system, at least one task for the worker based on at least the access role, the at least one task relating to machining of a part within the aircraft manufacturing facility; and
   automatically interface, by the computer system, with at least one of the various legacy systems of the aircraft manufacturing facility and automatically order, subject to the access role, at least one of machine tooling for the machining of the part, product materials to be machined, and distributed numerical control (DNC) control data for the machining of the part, wherein the machine tooling includes a cutting tool for the part to be machined.

2. The method of claim 1, wherein the interfacing further includes ordering assembly instructions for a machined part, wherein the assembly instructions are automatically ordered for the worker.

3. The method of claim 2, wherein the instructions are configured as at least one of an audio or a video instruction.

4. The method of claim 1, further comprising: facilitating input by the user to capture completed tasks, and determining a status of the operation based on the retrieved task information and the completed tasks.

5. The method of claim 1, wherein material to be machined is automatically ordered for the worker.

6. The method of claim 1, wherein machine tooling for performing the task is automatically ordered for the worker.

7. The method of claim 1, wherein a list of prioritized tasks is determined according to the access role; and wherein the list is displayed to the worker for selection of a task.

8. The method of claim 7, wherein the list includes machine tooling for each task; and wherein the machine tooling corresponding to the selected task is automatically retrieved for the worker.

9. The method of claim 1, wherein the DNC control data is automatically downloaded to a browser, which automatically uses the DNC control data to control a DNC machine to machine the part.

10. The method of claim 1, wherein determining a cutting tool for a part to be machined, determining setup time, and checking for correspondence between the part and its schematic are performed automatically for the worker.

11. The method of claim 1, wherein the interfacing includes ordering machine tooling for machining the part, product materials to be machined, and DNC control data for machining the part.

12. The method of claim 1, wherein the interfacing also includes ordering quality control data for machining the part.

13. The method of claim 12, wherein the quality control data is automatically obtained for the worker, whereby the worker can make adjustments to a DNC machine prior to machining the part.

14. The method of claim 1, wherein the interfacing also includes ordering assembly instructions for the part.

15. One or more non-transitory computer readable media encoded with computer-executable instructions that, when executed by a computer in the computer system, cause the computer to perform the method of claim 1.

* * * * *